US012060084B2

(12) United States Patent
Clawson

(10) Patent No.: US 12,060,084 B2
(45) Date of Patent: Aug. 13, 2024

(54) AUTONOMOUS VEHICLE TRAJECTORY DETERMINATION BASED ON STATE TRANSITION MODEL

(71) Applicant: Zoox, Inc., Foster City, CA (US)

(72) Inventor: Taylor Scott Clawson, Castro Valley, CA (US)

(73) Assignee: Zoox, Inc., Foster City, CA (US)

( * ) Notice: Subject to any disclaimer, the term of this patent is extended or adjusted under 35 U.S.C. 154(b) by 194 days.

(21) Appl. No.: 17/514,610

(22) Filed: Oct. 29, 2021

(65) Prior Publication Data
US 2023/0132512 A1    May 4, 2023

(51) Int. Cl.
*B60W 60/00*     (2020.01)
*B60W 30/095*    (2012.01)
*B60W 50/14*     (2020.01)

(52) U.S. Cl.
CPC ...... *B60W 60/0027* (2020.02); *B60W 30/095* (2013.01); *B60W 50/14* (2013.01); *B60W 2554/801* (2020.02); *B60W 2554/802* (2020.02); *B60W 2720/106* (2013.01); *B60W 2720/125* (2013.01)

(58) Field of Classification Search
CPC .......... B60W 60/0027; B60W 30/095; B60W 50/14; B60W 2554/801; B60W 2554/802; B60W 2720/106; B60W 2720/125
See application file for complete search history.

(56) References Cited

U.S. PATENT DOCUMENTS

| 5,253,271 | A  | * | 10/1993 | Montgomery | H04L 27/365 |
|-----------|----|---|---------|------------|-------------|
|           |    |   |         |            | 375/295 |
| 9,632,502 | B1 | * | 4/2017  | Levinson   | B60Q 1/507 |
| 10,133,275| B1 | * | 11/2018 | Kobilarov  | G06N 3/08 |
| 2016/0133064 | A1 | * | 5/2016 | Patino | B60W 50/045 |
|           |    |   |         |            | 701/29.1 |
| 2017/0176198 | A1 | * | 6/2017 | Tatourian | G01C 21/3453 |
| 2019/0056735 | A1 | * | 2/2019 | Koopman | G05D 1/0077 |
| 2019/0354111 | A1 |  | 11/2019 | Cheng et al. | |

(Continued)

FOREIGN PATENT DOCUMENTS

| JP | 2010203893 A | 9/2010 |
|----|--------------|--------|
| KR | 20210035481 A | 4/2021 |

OTHER PUBLICATIONS

The PCT Search Report and Written Opinion mailed Feb. 23, 2023 for PCT application No. PCT/US2022/047833, 11 pages.

*Primary Examiner* — Jason Holloway
*Assistant Examiner* — Madison B Emmett
(74) *Attorney, Agent, or Firm* — Lee & Hayes, P.C.

(57) ABSTRACT

Techniques are discussed herein for generating, evaluating, and determining trajectories for autonomous vehicles traversing environments. A state transition model may be generated and used to determine a trajectory from multiple possible trajectories generated by one or more vehicle systems. In some examples, a state transition model may determine a trajectory based on the validation results of the possible trajectories, along with vehicle status data from one or more vehicle components. Various techniques described herein may improve vehicle safety and driving efficiency, by ensuring that the vehicle determines a safe and valid trajectory consistently while navigating the environment, while also being responsive to requests and status updates from various vehicle components.

20 Claims, 11 Drawing Sheets

(56) References Cited

U.S. PATENT DOCUMENTS

| | | |
|---|---|---|
| 2020/0189573 A1 | 6/2020 | King et al. |
| 2020/0211394 A1* | 7/2020 | King .................... G06V 20/58 |
| 2020/0406928 A1* | 12/2020 | Rausch ................ B60W 40/09 |
| 2021/0004010 A1 | 1/2021 | Pan et al. |
| 2022/0204007 A1* | 6/2022 | Tsuchiya ............... G06F 9/4498 |

* cited by examiner

AUTONOMOUS VEHICLE TRAJECTORY DETERMINATION BASED ON STATE TRANSITION MODEL

BACKGROUND

Autonomous vehicles may be equipped with components to detect objects in driving environments, analyze the objects, and determine routes for the vehicle to navigate the environment safely and efficiently. For example, an autonomous vehicle may use a planning component to determine a vehicle trajectory, or planned driving path, through the environment. A vehicle trajectory may include a predetermined sequence of vehicle positions, orientations, velocities, accelerations, steering commands, and/or vehicles actions to be at different times by the vehicle while traversing the environment.

Additionally, autonomous vehicles also may include vehicle safety systems, component diagnostic systems, and the like, capable of detecting and avoiding potentially hazardous driving situations.

DETAILED DESCRIPTION

Figure 1:
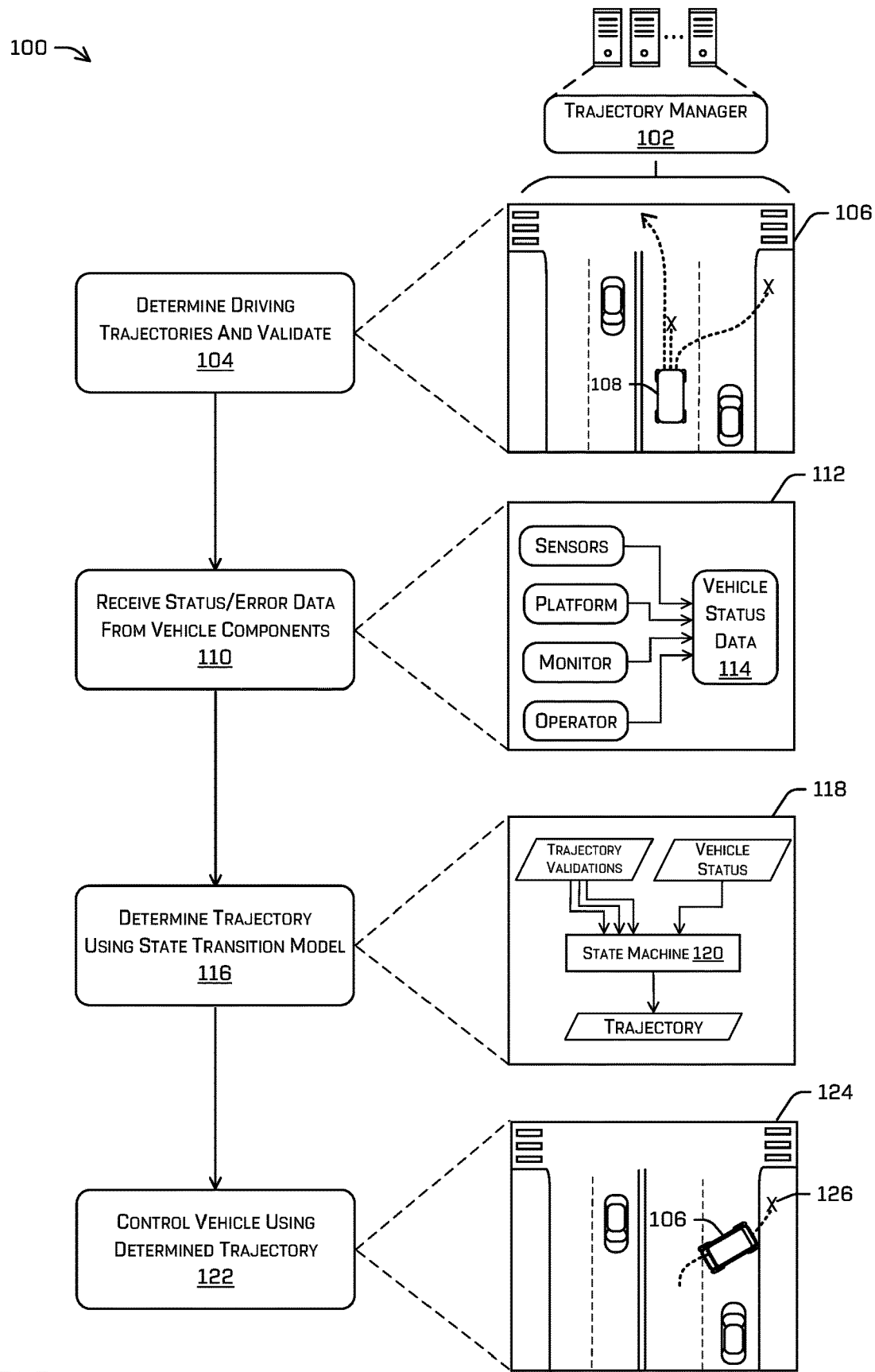
FIG. 1 is a pictorial flow diagram illustrating techniques for determining a vehicle trajectory using a state transition model, based on trajectory validation results and vehicle status data, in accordance with one or more examples of the disclosure.

This disclosure describes techniques for generating, evaluating, and determining trajectories for autonomous vehicles traversing environments. As described below in more detail, state transition models may be generated and used to determine a trajectory from multiple possible trajectories generated by various different vehicle systems. In some examples, a state transition model (which also may be referred to as a state machine) may determine an output trajectory based on the validation results of the possible trajectories, along with status or error data received from one or more vehicle components. As described in various examples below, the techniques described herein may improve vehicle safety and driving efficiency, by ensuring that the vehicle consistently selects safe and valid trajectories while navigating the environment, while also being responsive to alternative trajectory requests and status data from the various vehicle components.

When traversing driving environments, autonomous vehicles may use various sensors to capture sensor data associated with the environment. Sensor data, such as image data, radar data, lidar data, etc., may be associated with and may identify various objects within the environment. The objects encountered within an environment can include dynamic objects that are moving or capable of movement (e.g., vehicles, motorcycles, bicycles, pedestrians, animals, etc.), and/or static objects (e.g., buildings, road surfaces, trees, signs, barriers, parked vehicles, etc.). An autonomous vehicle may include components configured to determine information about the objects detected in the environment, such as components to identify objects and determine bounding boxes, perform object segmentation, classification, tracking, and the like.

Autonomous vehicle systems also may include one or more components to generate trajectories based on the destination of the vehicle, road data, and the objects detected in the environment. One or more vehicle trajectories may be generated by a planning component, that the vehicle may follow to traverse the environment safely and legally, while avoiding any possible interactions (e.g., collisions or near-miss collisions) with the other objects in environment. While a single trajectory may be generated in some cases, in other cases multiple potential trajectories may be generated, any number of which may be analyzed/validated to determine (e.g., select) a preferred trajectory for the vehicle to follow. In some examples, validating a trajectory may include determining whether the trajectory is valid for the vehicle, that is, in at least some examples, whether the vehicle physically capable of following the trajectory. Additionally or alternatively, validating a trajectory may include determining whether the trajectory may possibly intersect with one or more trajectories of any other objects detected in the environment. Additionally, while the autonomous vehicle is navigating the environment, various internal components and systems within the vehicle may output signals including component/system errors, alerts, status data, and/or requests for the vehicle to change to an alternative trajectory. As described below in more detail, the techniques herein may use trajectory selector configured to receive trajectory validation results and signals from various vehicle components, and to use one or more state transition models to determine an output trajectory for the vehicle to follow. A state transition model may include state logic associated with the different possible trajectories, allowing the trajectory selector to jointly evaluate the possible trajectories and determine an output trajectory at any point in time, based on the state machine logic.

As illustrated by these examples, the techniques described herein can improve the functioning, safety, and efficiency of autonomous and semi-autonomous vehicles traversing through driving environments. In various examples, a state transition model example of a trajectory selector may receive trajectory validation data from one or more vehicle systems at different times, and may receive additional signal data, errors, or requests from different vehicle systems at different times. In these examples, the state transition model may be used to jointly consider the trajectories, the trajectory validation results, and the errors and/or other signals received from the vehicle systems using the state machine logic, rather than based on a sequentially executed algorithms. By using the state machine logic, the state transition model may avoid errors caused by stale data and/or inconsistencies that may occur in sequentially executed algorithms. For instance, the techniques described herein using a state transition model to determine an output (or selected) trajectory based on trajectory validation results while jointly or simultaneously considering signals received from the various vehicle systems, may provide improvements over conventional systems in both safety and efficiency.

The techniques described herein can be implemented in a number of ways. Examples are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers.

FIG. 1 depicts an example process 100 for receiving and validating possible driving trajectories, receiving signals (e.g., status/error data) from vehicle systems or components, determining an output trajectory using a state transition model, and controlling the autonomous vehicle based on the output trajectory. In various examples, some or all of the operations in process 100 may be performed by a planning component, vehicle safety system, and/or other vehicle navigation system within an autonomous vehicle. For instance, as shown in this example process 100 may be implemented using a trajectory manager 102 (or trajectory management system). As described below in more detail, the trajectory manager 102 may include components such as a trajectory store, trajectory generator(s), trajectory validator, and/or trajectory selector, configured to receive candidate trajectories and vehicle status data from various vehicle components, and use a state transition model to determine a selected output trajectory.

At operation 104, a trajectory manager 102 may receive and/or determine a number of different possible driving trajectories, and may validate the driving trajectories to determine validation results for any number of the possible trajectories. For example, box 106 illustrates an autonomous vehicle 108 navigating a driving environment. In this example, three different possible trajectories are shown that may be followed by the autonomous vehicle 108. One of the trajectories shown in box 106 is a continuing trajectory, as indicated by an arrow at the end of the dotted line for the trajectory. In some examples, a continuing trajectory may be a trajectory generated by a planning component toward an intended destination of the autonomous vehicle. In contrast, the other two trajectories shown in box 106 are stopping trajectories, as by the end of the trajectory being marked with an "X". Unlike continuing trajectories, stopping trajectories may be designed to bring the vehicle to a stop before reaching an intended destination. For instance, a stopping trajectory may be determined to avoid a collision or other potential hazard, or in response to an error or malfunction in a vehicle component, etc.

In various examples, an autonomous vehicle may be configured to generate any number of possible trajectories that the vehicle may use to traverse a driving environment. A trajectory may be associated with a destination for the vehicle, and can be generated based on the detection, classification, and tracking of various objects in the vicinity of the autonomous vehicle. As described below in more detail, the trajectory manager 102 may be configured to receive one or more possible trajectories (e.g., candidate trajectories) for the vehicle to follow, and to determine which of the candidate trajectories to follow based on trajectory validation results and/or signals from vehicle components. As described herein, a trajectory may comprise a set of locations, corresponding times, and/or other data (e.g., velocities, accelerations, poses, steering angles or rates, etc.) for the vehicle to achieve over a period of time (e.g., 0.5, 1, 2, 4, 8 seconds, etc.) in the future.

In operation 104, the trajectory manager 102 may receive one or more candidate trajectories from a planning component of the autonomous vehicle. The planning component (or "planner") may generate candidate trajectories based on an intended destination of the vehicle, as well as based on the outputs of the perception and prediction component, such as object locations, sizes, and classifications, predicted object trajectories, etc. A trajectory generated by the planning component may be referred herein as a planner trajectory. The planner component, in conjunction with other components of the autonomous vehicle (e.g., the localization, perception, prediction, and map components) may determine one or more planner trajectories to guide the vehicle to the intended destination. When determining a planner trajectory, the autonomous vehicle may analyze the captured sensor data to detect and identify one or more other dynamic objects within the environment in the proximate vicinity of the vehicle. The prediction component may determine predicted trajectories for the other dynamic objects, and the planner component may determine a planner trajectory to traverse the environment based on the map data and the desired destination of the vehicle, as well as the types, positions, and predicted trajectories of the other objects in the environment. In some examples, a planner component may be implemented within the trajectory manager 102, and in other examples, a planner component external to the trajectory manager 102 may generate and transmit planner trajectories to the trajectory manager 102. Examples of various techniques for generating planner trajectories for autonomous vehicles can be found, for example, in U.S. Pat. No. 10,921,811, filed on Jan. 22, 2018, issued on Feb. 16, 2021, and titled, "Adaptive Autonomous Vehicle Planner Logic," and U.S. Pat. No. 10,955,851, filed on Feb. 14, 2018, issued on Mar. 23, 2021, and titled, "Detecting Blocking Objects," each of which is incorporated by reference herein in its entirety.

In addition to planner trajectories, in some examples the trajectory manager 102 may include a trajectory generator configured to generate additional candidate trajectories. For instance, the additional candidate trajectories may be associated with vehicle safety systems (e.g., a vehicle diagnostic system, etc.), and may represent alternative trajectories to the planner trajectories. For instance, a trajectory generator associated with a vehicle safety system may generate one or more alternative trajectories for the vehicle to follow in the event of a road hazard, potential collision, or a vehicle component error or malfunction.

The trajectory generator may generate different alternative trajectories (which also may be referred to as error trajectories) to be used for any number of different vehicle errors, malfunctions, and/or other potential hazards. For instance, in some examples, the trajectory generator may generate a first alternative trajectory (e.g., an error trajectory) to be used for certain minor vehicle component errors or malfunctions, a second alternative trajectory (e.g., a high-priority error trajectory) to be used for other more serious/critical vehicle component errors or malfunctions, and a third alternative trajectory (e.g., an immediate stop trajectory) to be used for other more serious/critical vehicle component errors or malfunctions. The alternative trajectories generated by the trajectory generator may represent more cautious driving trajectories than the planner trajectories in some cases (e.g., reduced speeds, greater following distances, reduced lateral and longitudinal accelerations, increased decelerations in either a lateral or longitudinal direction, etc.). Additionally or alternatively, the alternative trajectories generated by the trajectory generator may be stopping trajectories that will bring the vehicle to safe and quick stop, to avoid a hazard or so that a vehicle error/malfunctions can be addressed. For instance, a first error trajectory may be designed to stop the autonomous vehicle while complying with all traffic and safety rules and using a relatively mild deceleration. In contrast, a high-priority error trajectory may be designed to stop the autonomous vehicle more quickly using a stronger deceleration, and an immediate stop trajectory may be designed to stop the autonomous vehicle immediately using a maximum safe deceleration and without steering the vehicle. Although in this example an immediate stop trajectory may be considered as a trajectory, in some cases an immediate stop trajectory may be implemented as a set of drive system commands (e.g., a steering lock command and maximum braking command), rather than as a trajectory including a sequence of locations and/or vehicle states that can tracked or followed by the vehicle. Additionally, although this example and certain other examples herein may describe only one planner trajectory and three alternative trajectories (e.g., an error trajectory, a high-priority error trajectory, and an immediate stop trajectory), it can be understood from the context of this disclosure that the techniques described herein can be used with any number of different planner trajectories and/or alternative trajectories.

Further, the planner and/or the trajectory generator may periodically re-generate and/or update any number of the trajectories multiple times as the vehicle traverses the environment. For instance, the planner may output a new or updated planner trajectory for each processing and/or output cycle of the planner, and the trajectory generator may output a new or updated set of alternative trajectories for each processing and/or output cycle of the trajectory generator. The processing and/or output cycles for the planner and the trajectory generator may be the same or different, which may cause different updated trajectories to be provided to the trajectory manager 102 at different times as the vehicle traverses the environment.

Operation 104 also may include validating the planner trajectories and/or alternative trajectories received respectively from the planner and the trajectory generator. In some examples, the trajectory manager 102 may include a trajectory validator configured to analyze and evaluate any number of the potential (or candidate) trajectories. The trajectory validator may be located within the trajectory manager 102, or in another system of an autonomous vehicle. In some examples, the trajectory validator may have different validator components for different trajectory types (e.g., planner trajectories, error trajectories, immediate stop trajectories, etc.). To validate a trajectory, the trajectory validator may perform various different validation processes and/or operations to assess the quality and/or safety of a candidate trajectory. For instance, the trajectory validator may determine whether an input trajectory is valid for an autonomous vehicle by determining whether or not the vehicle is physically capable of following (or tracking) the trajectory. For instance, if following a candidate trajectory would require a steering angle, an acceleration, or a deceleration that the vehicle is not capable of performing based on its current position and trajectory, then the trajectory validator may determine that the candidate trajectory is invalid. In some cases, a candidate trajectory generated for a moving vehicle may remain valid for a period of time after the trajectory is initially generated, but may become invalid after the period of time as the vehicle proceeds along a different trajectory.

Additionally or alternatively, the trajectory validator may determine that a trajectory is invalid if it intersects (or comes within a threshold distance of intersecting) a predicted trajectory associated with another object. As noted above, a prediction component of the autonomous vehicle may determine predicted trajectories for various other objects in environment (e.g., other vehicles, bicycles, pedestrians, etc.) of the autonomous vehicle. When a candidate trajectory of the autonomous vehicle is projected to intersect with a predicted object trajectory at a future point in time, or if the predicted object trajectory is projected to pass within a predefined distance buffer of the autonomous vehicle at a future time, then the trajectory validator may determine that the candidate trajectory is invalid. Once the trajectory validator has determined the validation results for a candidate trajectory, including whether the candidate trajectory is physically possible for the vehicle and whether the candidate trajectory may potentially result in an interaction with another object, the trajectory validator may send the validation results to a trajectory selector component (described below). As noted above, the autonomous vehicle may generate multiple candidate trajectories at periodic points in time (e.g., one or more planner trajectories, an error trajectory, a high-priority error trajectory, an immediate stop trajectory, etc.), and the validator may perform similar or identical validation operations on any number of the possible trajectories, before sending the trajectory results to the trajectory selector.

At operation 110, the trajectory manager 102 may receive status and/or error data from one or more components (e.g., systems, subsystems, processes, etc.) of the autonomous vehicle. Box 112 depicts an example in which various vehicle components (e.g., sensors, platform, pose system, and monitor) may provide vehicle status data 114 to the trajectory manager 102. The vehicle status data 114 may include any data associated with an output from a vehicle system or component, such as vehicle performance metrics, errors or alerts, system faults or malfunctions, manual requests from a passengers or teleoperator of the vehicle, etc. In some cases, vehicle status data 114 may include a request from an automated or manual system to switch the vehicle onto an alternative trajectory, or to return the vehicle to a planner trajectory. For instance, an occupant of an autonomous vehicle or a teleoperator may press an actuator or provide a response via user interface displayed inside the vehicle, on a mobile device, or via a remote computing system, to transmit vehicle status data 114. The vehicle status data 114 in such cases may include, for instance, a request to disengage a current (e.g., planner) trajectory and follow an alternative (e.g., error, high-priority error, or immediate stop) trajectory, or vice versa. In some cases, input from a human operator (e.g., a remote teleoperator or passenger of the vehicle) may be required to transition between certain states of the state transition logic. For instance, in some examples operator input may be required to transition from more restrictive trajectories to less restrictive trajectories (e.g., from an immediate stop trajectory to a high-priority error trajectory, from a high-priority error trajectory to an error trajectory, from an error trajectory to a planner trajectory, etc.). However, in these examples, operator input might not be required to transition from less trajectories to more restrictive trajectories, and state transition may be performed automatically based on the trajectory validation results and (non-operator) vehicle status data. As described below, the trajectory manager may provide the vehicle status data 114 to a trajectory selector component, along with the trajectory validation results determined in operation 104.

At operation 116, the trajectory manager 102 may use a state transition model to determine (e.g., select) a trajectory from one of the candidate trajectories for the vehicle to follow. As used herein, a state transition model may include an example of a state machine configured to perform state transition logic. Examples of state transition models may include any computer-based algorithm and/or data structure configured to implement a state machine or finite-state machine computational model. Various examples of state transition models, including different states and state transition criteria, are described in more detail below. Box 118 illustrates an example state machine 120 (or state transition model) configured to receive three separate trajectories (e.g., a planner trajectory, an error trajectory, and high-priority error trajectory) and vehicle status data (e.g., vehicle status data 114). In this example, the state machine 120 may be designed and configured to determine a state corresponding to an output trajectory for the autonomous vehicle 108 to follow.

In various examples, a state transition model used to determine an output trajectory may be implemented based on different combinations of vehicle features, safety criteria, etc. In some cases, a state transition model may include separate state logic (or state machines) associated with each possible output trajectory. Transition criteria based on a combination of the trajectory validation results and/or vehicle status data may cause state transitions from one output trajectory to another. Additionally, in some cases the state transition model may be designed to transition to and output a previously generated and/or previously validated stored trajectory (e.g., a planner or alternative trajectory from a previous processing cycle), when the state logic determines the stored trajectory is preferred over any of the trajectories generated for the current processing cycle. Although only one state machine 120 is shown in this example, in other examples different state transition models may be developed and used for different vehicles (e.g., having different trajectories, different diving capabilities, different types of vehicle status data, etc.). Additionally, different state transition models may be developed and used for the same vehicle in some cases, in which the different state transition models may implement different driving priorities (e.g., a first state transition model that weights the transition criteria toward immediate stopping trajectories, a second state transition model that weights the transition criteria toward error trajectories that quickly clear the lane and stop on the shoulder, etc.).

As noted above, utilizing state transition models to determine an output trajectory for the autonomous vehicle may improve the efficiency and quality of trajectory selection in some cases. For instance, use of a state transition model may increase the efficiency of trajectory determinations, by using the transition criteria to quickly determine an output trajectory even when certain expected data is not received or available. In contrast, a conventional system implementing a sequential algorithm may delay and wait until all input data (e.g., trajectory validation results and status data) is received, which may hang or slow down the trajectory selection process, or may stop the trajectory selection process completely. However, by using state transition models, when the trajectory manager 102 does not receive one or more expected trajectories, validation results, or vehicle status data, the lack of received data need not cause any functional problems in executing the state transition logic. In this example, the trajectory manager 102 may be configured to receive one or more planner trajectories and/or one or more alternative trajectories, as well as vehicle status data 114. The trajectory manager 102 may provide the input data to a trajectory selector utilizing a state machine 120 to execute the state transition logic based on the input provided, and consistently determine an output trajectory based on the state logic that takes all input data into account jointly rather sequentially, enabling all relevant input data to be considered at each processing cycle.

At operation 122, the trajectory manager 102 may use the output trajectory determined using the state machine 120, to control the vehicle. For instance, the trajectory manager 102 may provide the output trajectory to the planning component and/or system controllers of the vehicle, to determine the vehicle control commands to track the output trajectory. In this example, box 124 illustrates an environment in which the autonomous vehicle 108 has determined one of the alternative trajectories (e.g., an error trajectory), which is a stopping trajectory terminating at a stopping location 126 on the shoulder of the road. In other examples, controlling the autonomous vehicle in operation 122 may include engaging or disengaging a vehicle safety system based on the output trajectory, changing between two different planner trajectories, between two different alternative trajectories, or between a planner and an alternative trajectory (or vice versa).

Further, although these examples describe controlling the autonomous vehicle to follow the output trajectory, in other examples controlling the vehicle in operation 122 may include other control operations, instead of or in addition to causing the vehicle to follow the output trajectory. For instance, controlling the vehicle also may include activating interior or exterior emitters (e.g., warning lights, horn or audio alerts, etc.), engaging or disengaging an autonomous driving mode, initiating a request for teleoperator assistance, and the like.

Figure 2:
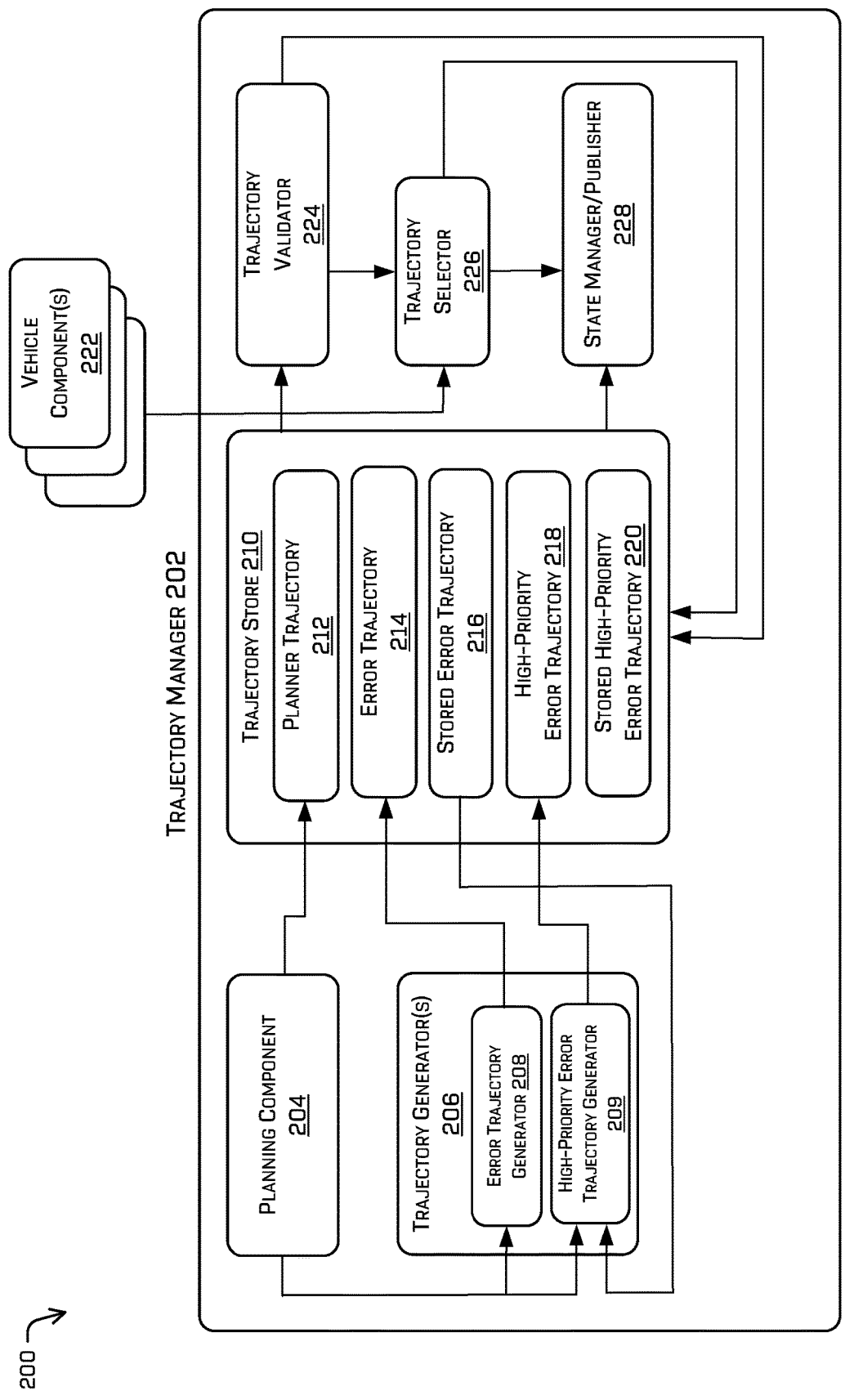
FIG. 2 illustrates an example system including components for generating, validating, and determining vehicles trajectory, in accordance with one or more examples of the disclosure.

FIG. 2 shows a block diagram 200 illustrating an example trajectory manager 202 configured to generate, validate, and/or determine a driving trajectory for an autonomous vehicle. The trajectory manager 202 may be similar or identical to the trajectory manager 102 described above. As noted above, in some cases the trajectory manager 202 may be implemented within or otherwise associated with a vehicle safety system in an autonomous vehicle. The trajectory manager 202 may include various subcomponents, described below, configured to perform different functionalities of a trajectory selection technique. In some examples, vehicle trajectories may be generated by the components within the trajectory manager 202. In other examples, vehicle trajectories may be generated by components or systems outside the trajectory manager 202, and may be subsequently sent to the trajectory manager 202 for validation and selection.

In some examples, the trajectory manager 202 may include a planning component 204. The planning component 204 (or "planner") may generate one or more candidate trajectories corresponding to an intended destination of the vehicle, each of which may be referred to as a planner trajectory 212. For example, the planning component 204, in conjunction with other components of the autonomous vehicle (e.g., the localization, perception, prediction, and map components) may determine one or more planner trajectories 212 to guide the vehicle to the intended destination. When determining a planner trajectory 212, the autonomous vehicle 108 may analyze the captured sensor data to detect and identify one or more other dynamic objects within the environment in the proximate vicinity of the vehicle. The prediction component may determine predicted trajectories for the other dynamic objects, and the planning component 204 may determine a planner trajectory 212 to navigate the environment based on the map data and the desired destination of the vehicle, as well as the types, positions, and predicted trajectories of the other objects in the environment.

Additionally or alternatively, the trajectory manager 202 may include one or more trajectory generator(s) 206, configured to determine one or more additional candidate trajectories, which may be alternative trajectories to the planner trajectory 212. For instance, the trajectory generator(s) 206 may generate various alternative trajectories to be followed by the vehicle in the event of a road hazard, potential collision, vehicle component error, malfunction or alert, or a request from a component system to switch the vehicle to an alternative trajectory. As shown in this example, the trajectory generator(s) 206 may include one or multiple separate trajectory generating systems. For instance, the trajectory generator(s) 206 may include an error trajectory generator 208, a separate high-priority error trajectory generator 209, and/or various other trajectory generators (e.g., an immediate stop trajectory generator).

In this example, the error trajectory generator 208 may be configured to generate one or more alternatives (or error trajectories) to the planner trajectory. An error trajectory 214 may represent a stopping trajectory in some cases, that can be used to bring the vehicle to safe and quick stop so that any vehicle component errors or malfunctions can be addressed. As an example, an error trajectory 214 may be a trajectory designed to stop the autonomous vehicle within a distance threshold based on an error, alert, or malfunction, while complying with all traffic and safety rules and using a relatively mild deceleration. The error trajectory 214 may be associated with any number of minor vehicle errors and/or malfunctions. In other cases, an error trajectory 214 need not be a stopping trajectory, but may represent an alternative driving trajectories without any defined stopping point before the destination. For instance, an error trajectory 214 may include a reduced speed requirement, a greater following distance requirement, a reduced lateral and longitudinal acceleration limit, etc.).

In this example, the trajectory manager 202 also includes a high-priority error trajectory generator 209 in addition to the error trajectory generator 208. The high-priority error trajectory generator 209 may generate one or more high-priority error trajectories 218. In some cases, a high-priority error trajectory 218 may be associated with a relatively more serious or urgent component error, alert, vehicle malfunction, or other potential hazard. For instance, a high-priority error trajectory 218 may correspond to cautious driving trajectory, and/or quicker or more urgent stopping trajectory, than the error trajectories 214, to bring the vehicle 108 to a safe and quick stop more quickly so that the relatively serious errors and/or malfunctions can be addressed. For instance, a high-priority error trajectory 218 may be designed to stop the autonomous vehicle more quickly using a stronger deceleration than the error trajectory, and may be less likely to clear the lane and use the shoulder.

The various candidate trajectories generated by the planning component 204 and/or trajectory generator(s) 206 may be sent to a trajectory store 210. The trajectory store 210 may receive and store the candidate trajectories for the vehicle. As shown in this example, the trajectory store 210 may be configured to retain multiple different candidate trajectories associated with a current processing cycle (e.g., the planner trajectory 212, error trajectory 214, and high-priority error trajectory 218), as well as additional stored candidate trajectories that were generated for a previous processing cycle (e.g., the stored error trajectory 216 and stored high-priority error trajectory 218). As described below in more detail, if any or all of the trajectories generated within the current processing cycle or invalid or otherwise not suitable for the vehicle, then the state logic of the trajectory selector 226 may be configured to determine one of the stored trajectories from a previous processing cycle as the output trajectory.

The trajectory validator 224 may be configured to evaluate any or all of the trajectories from the trajectory store 210. In some examples, the trajectory validator 224 may include a separate validator component and/or separate validation criteria for the different trajectory types (e.g., planner trajectory 212, error trajectory 214, high-priority error trajectory 218, etc.). To validate a trajectory, the trajectory validator 224 may execute one or more software-based processes to assess the quality and safety of a candidate trajectory. For instance, the trajectory validator 224 may determine whether an input trajectory is valid based on whether the trajectory is feasible for the vehicle, that is, whether the vehicle is physically capable of following the trajectory. Additionally or alternatively, the trajectory validator 224 may determine that a trajectory is invalid if it intersects (or comes within a threshold distance of intersecting) a predicted trajectory associated with another object in the environment. For instance, the trajectory validator 224 may receive and analyze the predicted trajectories for various other objects in environment, and when a candidate trajectory is projected to intersect with a predicted object trajectory (or pass within a predefined distance of the predicted object trajectory) at a future time, then the trajectory validator 224 may determine that the candidate trajectory is invalid.

In some cases, the validation results for a candidate trajectory may include a binary value (e.g., valid or not valid), while in other cases the validation results may include more detailed information. For instance, a validation result for an invalid trajectory also may include data identifying the reason that the trajectory is invalid (e.g., cannot be performed, possible object interaction, projected near-miss, etc.), a likelihood (or probability, uncertainty, etc.) that the trajectory is invalid, etc.

Once the trajectory validator 224 has determined the validation results for a candidate trajectory, including whether the candidate trajectory is physically possible for the vehicle to perform and whether the candidate trajectory may potentially result in an interaction with another object, the trajectory validator 224 may transmit the validation results to the trajectory selector 226. Thus, in this example, the trajectory validator 224 may transmit the validation results for each of the planner trajectory 212, the error trajectory 214, the stored error trajectory 216, the high-priority error trajectory 218, and the stored high-priority error trajectory 220. In other examples, any number or type of trajectories may be stored in the trajectory store 210 and validated by the trajectory validator 224.

As shown in this example, the trajectory selector 226 may receive the trajectory validation results associated with the trajectories in the trajectory store 210, as well vehicle status data from one or more vehicle components 222. As described above, the vehicle components may include, for example, the sensors of the vehicle, the vehicle platform, the pose system, the vehicle monitor systems, and/or any other system of the autonomous vehicle. The vehicle status data may include, but is not limited to performance metrics performance metrics, component errors, alerts, system faults, malfunctions, and/or manual or automated requests to change to or from an alternative trajectory. Thus, the vehicle status data may contain data identifying particular system faults, errors, alerts, etc., which are associated different types of alternative trajectories (e.g., error trajectories, critical error trajectories, etc.). Certain vehicle status data also may include requests for the autonomous vehicle to follow a particular planner or alternative trajectory (e.g., a planner trajectory, error trajectory, high-priority error trajectory, or immediate stop trajectory). The vehicle status data may be sent via internal signals from the various vehicle components 222, to the trajectory selector 226, in accordance with the internal timing and processing cycles of the individual vehicle components 222.

The trajectory selector 226 may be configured to use a state transition model to process input data, including the trajectory validation results from the trajectory validator 224 and/or vehicle status data from one or more vehicle components 222, to determine an output trajectory. As noted above, the state transition model used by the trajectory selector 226 may any state machine (e.g., computer-based algorithm and/or data structure) configured to perform state transition logic and output states corresponding to trajectories. The trajectory selector 226 may use the state transition model to determine a selected (or output) trajectory for the vehicle to follow, from among the received candidate trajectories, by executing the state transition logic and determining the output state (or output trajectory) of the state transition model.

As shown in this example, the output trajectory determined by the trajectory selector 226 may be stored and provided from the trajectory manager 202 to various downstream components via a state manager/publisher 228. In some examples, the current output trajectory as determined by the state transition model of the trajectory selector 226 is stored in the manager/publisher 228, and is updated automatically in response to a change of the output state from the trajectory selector 226.

When a trajectory in the trajectory store 210 is no longer the most recent trajectory output by the trajectory source, the trajectory store 210 may update the trajectory within the store. In some cases, the trajectory store 210 also may retain one or more previous trajectories from each trajectory source as "stored" trajectories. Any stored trajectories (e.g., stored error trajectory 216 and stored high-priority error trajectory 218) retrained within the trajectory store 210 may potentially be selected by the trajectory selector 226 as the current output trajectory. A stored trajectory may be retrained within the trajectory store 210 until the stored trajectory is either stale or no longer viable and should be removed from the trajectory store 210. In some examples, the trajectory validator 224 may use a time threshold and/or a state deviation threshold (e.g., a distance between the current vehicle state and the nearest state on the trajectory) to determine whether a stored trajectory is still feasible or whether it is stale and should be removed from the trajectory store 210. To compare a current vehicle state to a state on the trajectory, the trajectory validator 224 may compare the physical location of the vehicle to the corresponding location (e.g., at the same time point) on the trajectory, as well as another of additional vehicle state conditions (e.g., velocity, acceleration, yaw, etc.). Thresholds may be determined for any number of vehicle state conditions to determine whether a stored trajectory should be retained or removed from the trajectory store 210.

Additionally, as shown in this example, the trajectory validator 224 and/or the trajectory selector 226 may transmit their respective results as output back to the trajectory store 210. The trajectory validator 224 may transmit indications of which trajectories were determined to be valid and invalid, and the trajectory selector 226 may transmit indications of which trajectory was selected as the output trajectory. During normal operation, the trajectory store 210 may periodically receive and replace its existing trajectories with new or updated trajectories received from the planning component 204 and/or the trajectory generator(s) 206. However, in response to feedback from the trajectory validator 224 and/or the trajectory selector 226, the trajectory store 210 may determine that certain trajectories should be retained, and/or that other trajectories should be preemptively removed and/or replaced. For instance, when the trajectory selector 226 determines a particular trajectory (e.g., a stored trajectory) as the output trajectory, the trajectory store 210 may be configured to retain the selected trajectory and not to replace it until after a different trajectory has been selected. Additionally, when the trajectory validator 224 determines that a particular trajectory is invalid, the trajectory store 210 may determine that the trajectory need not be retained and may be removed from the trajectory store 210.

Figure 3:
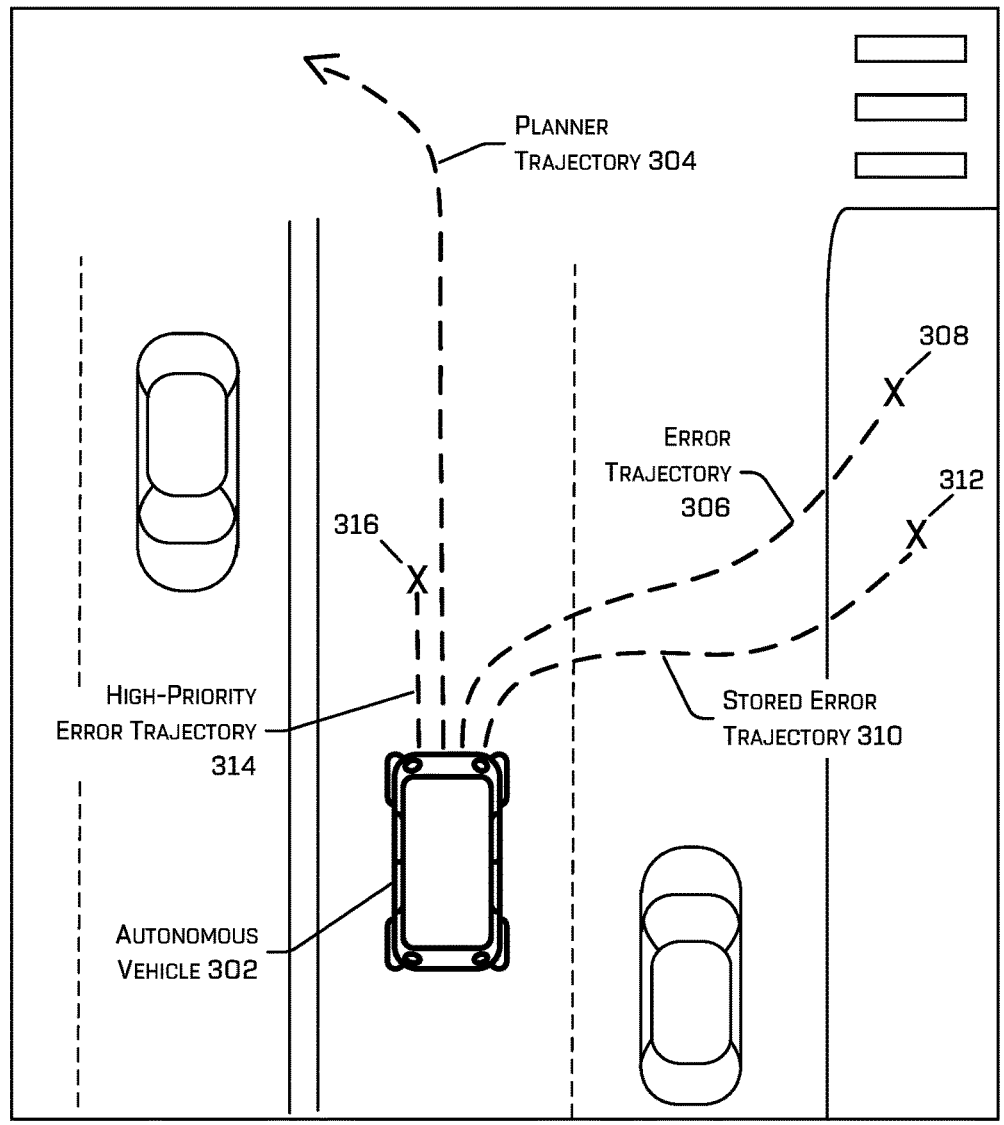
FIG. 3 illustrates an example driving environment in which a number of alternative trajectories are determined for an autonomous vehicle traversing the environment, in accordance with one or more examples of the disclosure.

FIG. 3 shows an example driving environment 300 illustrating an autonomous vehicle 302 traversing the environment, and a number of candidate trajectories determined for the autonomous vehicle 302. As shown in this example, the trajectory manager 202 has determined a number of candidate trajectories for the autonomous vehicle 302, including a planner trajectory 304 and three alternative stopping trajectories that may be used in the event of vehicle component errors, malfunctions, and/or other potential hazards. The first alternative trajectory in this example is the error trajectory 306, which terminates at a stopping point 308 on the shoulder of the road. The second alternative trajectory in this example is the stored error trajectory 310, which terminates at a different stopping point 312 on the shoulder of the road. As noted above, in some cases the error trajectory 306 and stored error trajectory 310 may be generated by the same error trajectory generator 208, but the stored error trajectory 310 may be an older trajectory associated with a previous processing cycle of the error trajectory generator 208. Accordingly, in this example the stored error trajectory 310 may be invalid because it would require the autonomous vehicle 302 to perform a sharp turn and lateral acceleration that it is incapable of performing, or may be unsafe to perform. The third alternative trajectory in this example is the high-priority error trajectory 314, which terminates at a different stopping point 316 within the same lane and not on the shoulder of the road. As noted above, certain alternative trajectories such as high-priority error trajectories and immediate stop trajectories may be used for more serious or critical vehicle component errors or malfunctions. Accordingly, these alternative trajectories may deprioritize factors such as lane clearance and traffic congestion avoidance, and may prioritize stopping the vehicle as quickly as possible.

Figure 4A:
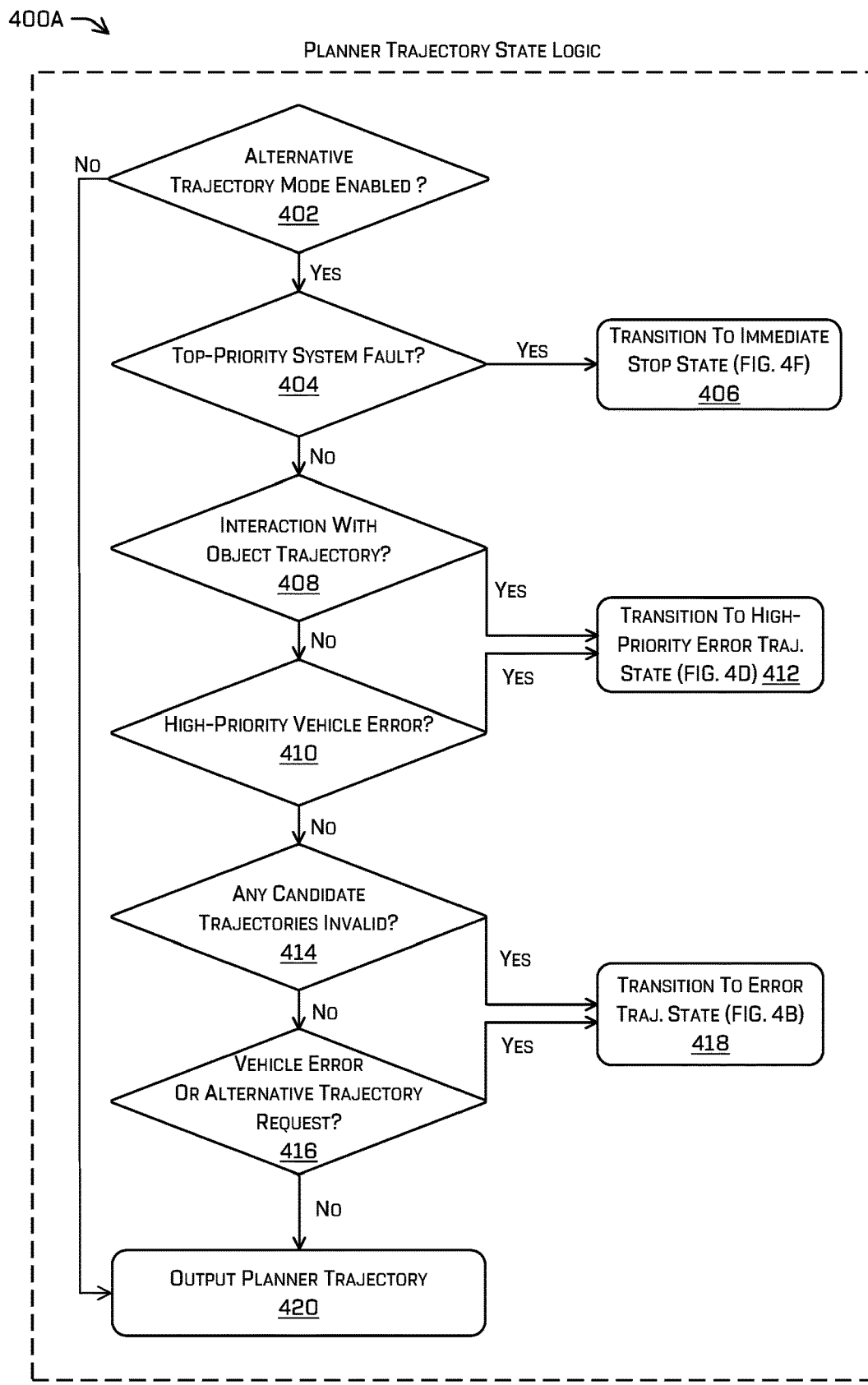
FIGS. 4A-4F illustrates an example state transition model including state logic diagrams associated with a number of example vehicle trajectories, in accordance with one or more examples of the disclosure.

FIG. 4A-4F depict an example state transition model including a number of state logic diagrams associated with vehicle trajectories and implementing state transition logic. Referring now to FIG. 4A, a planner trajectory state logic diagram 400A is shown that may be included in an example state transition model for determining an output planner trajectory. The state logic diagram 400A may be implemented as a state transition model (or state machine), or a portion thereof in conjunction with the other state logic diagrams shown in FIGS. 4A-4F. In this example, when the state transition model is executed in the planner trajectory state, at operation 402 the state logic may determine whether an alternative trajectory mode is enabled on the autonomous vehicle. For instance, it may be undesirable in some cases for a planner trajectory to be overridden while an operator (e.g., a vehicle occupant to teleoperator) is driving the vehicle in a fully or partially manual mode. Thus, if the autonomous vehicle does not have an alternative trajectory mode enabled (402:No), then the state logic may output the planner trajectory in operation 420. If the autonomous vehicle does not have an alternative trajectory mode enabled (402:Yes), then in operation 404 the state logic may determine whether a top-priority system fault has been received (e.g., as vehicle status data via vehicle components 222). If a top-priority system fault has been received (404:Yes), then in operation 406 the state logic may transition to the immediate stop state depicted in diagram 400F. If a top-priority system fault has not been received (404:No), then in operation 408 the state logic may determine whether the planner trajectory is projected to interact with the predicted trajectory of another object. If the planner trajectory is projected to interact with the predicted trajectory of another object (408:Yes), then in operation 412 the state logic may transition to the high-priority error trajectory state depicted in diagram 400D. If the planner trajectory is not projected to interact with the predicted trajectory of another object (408:No), then in operation 410 the state logic may determine whether a high-priority vehicle error has been received (e.g., as vehicle status data via vehicle components 222). If a high-priority vehicle error has been received (410:Yes), then in operation 412 the state logic may transition to the high-priority error trajectory state depicted in diagram 400D. If a high-priority vehicle error has not been received (410:No), then in operation 414 the state logic may determine whether any of the candidate trajectories are invalid. If any of the candidate trajectories are invalid (414:Yes), then in operation 418 the state logic may transition to the error trajectory state depicted in diagram 400B. If none of the candidate trajectories are invalid (414:No), then in operation 416 the state logic may determine whether a vehicle error or alternative trajectory request has been received (e.g., as vehicle status data via vehicle components 222). If a vehicle error or alternative trajectory request has been received (416:Yes), then in operation 418 the state logic may transition to the error trajectory state depicted in diagram 400B. If a vehicle error or alternative trajectory request has not been received (416:No), then the state logic may output the planner trajectory in operation 420.

Figure 4B:
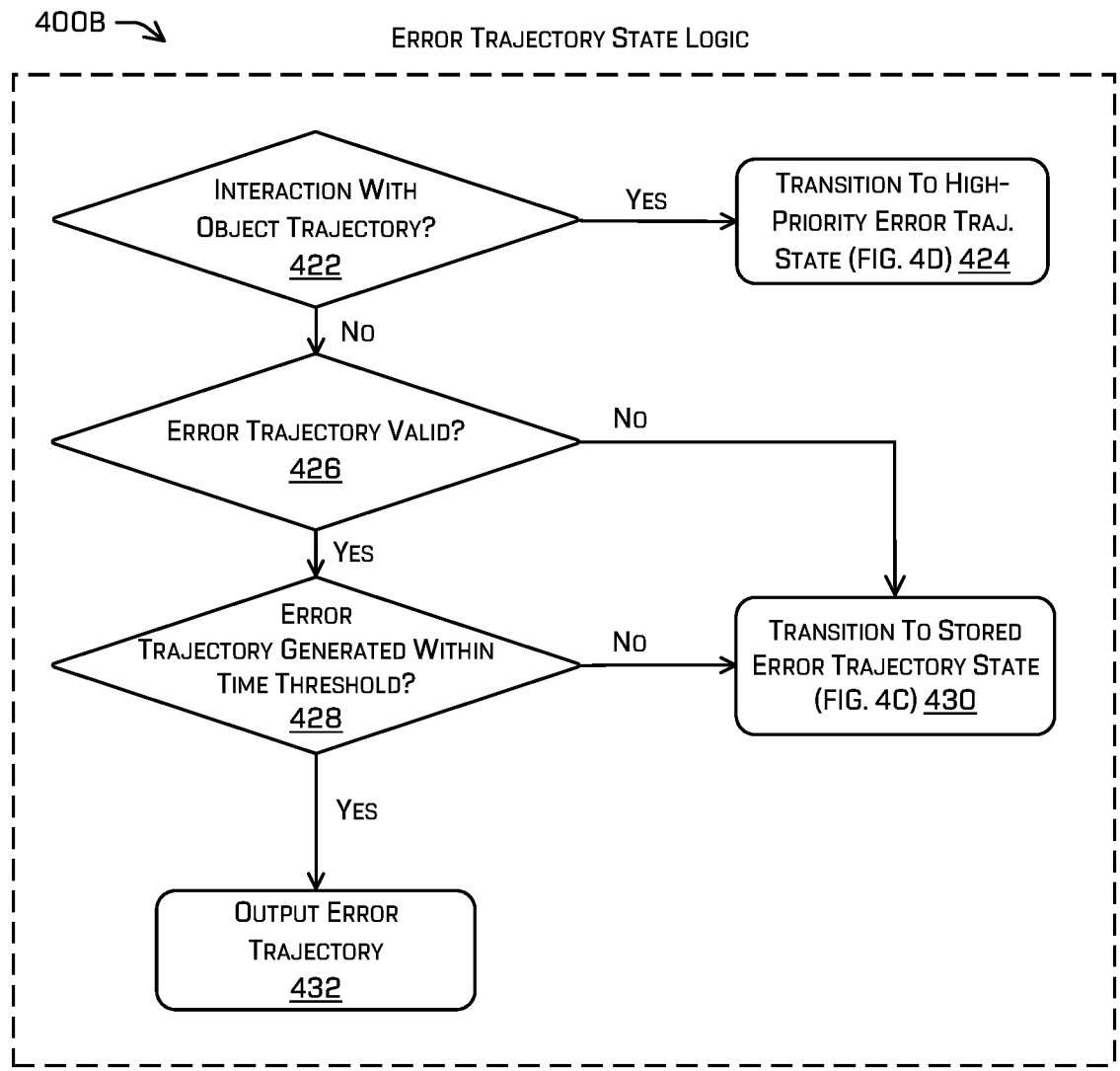

Referring now to FIG. 4B, an error trajectory state logic diagram 400B is shown that may be included in an example state transition model for determining an output planner trajectory. The state logic diagram 400B may be implemented as a state transition model (or state machine), or a portion thereof in conjunction with the other state logic diagrams shown in FIGS. 4A-4F. In this example, when the state transition model is executed in the error trajectory state, at operation 422 the state logic may determine whether the error trajectory is projected to interact with the predicted trajectory of another object. If the error trajectory is projected to interact with the predicted trajectory of another object (422:Yes), then in operation 424 the state logic may transition to the high-priority error trajectory state depicted in diagram 400D. If the error trajectory is not projected to interact with the predicted trajectory of another object (422:No), then in operation 428 the state logic may determine whether the error trajectory is valid. If the error trajectory is not valid (426:No), then in operation 430 the state logic may transition to the stored error trajectory state depicted in diagram 400C. If the error trajectory is valid (426:Yes), then in operation 428 the state logic may determine whether the error trajectory was generated within a time threshold (e.g., within the current processing cycle for the error trajectory generator 208). If the error trajectory was not generated within the time threshold (428:No), then in operation 430 the state logic may transition to the stored error trajectory state depicted in diagram 400C. If the error trajectory was generated within the time threshold (428:Yes), then the state logic may output the error trajectory in operation 432.

Figure 4C:
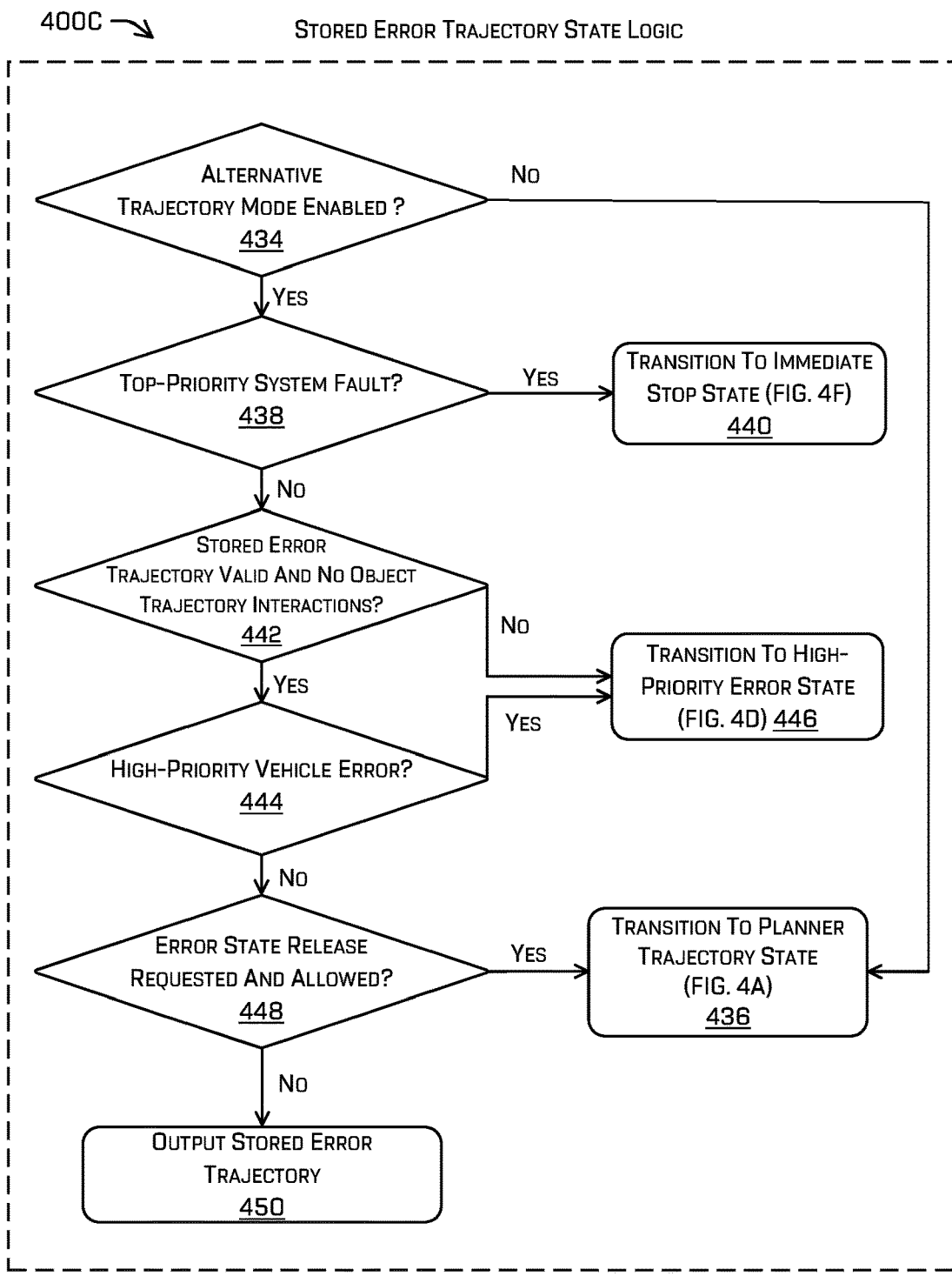

Referring now to FIG. 4C, a stored error trajectory state logic diagram 400C is shown that may be included in an example state transition model for determining an output planner trajectory. The state logic diagram 400C may be implemented as a state transition model (or state machine), or a portion thereof in conjunction with the other state logic diagrams shown in FIGS. 4A-4F. In this example, when the state transition model is executed in the stored error trajectory state, at operation 434 the state logic may determine whether the alternative trajectory mode is enabled on the autonomous vehicle. If the alternative trajectory mode is not enabled on the autonomous vehicle (434:No), then in operation 436 the state logic may transition to the planner trajectory state depicted in diagram 400A. If the alternative trajectory mode is enabled on the autonomous vehicle (434:Yes), then in operation 438 the state logic may determine whether a top-priority system fault has been received (e.g., as vehicle status data via vehicle components 222). If a top-priority system fault has been received (438:Yes), then in operation 440 the state logic may transition to the immediate stop state depicted in diagram 400F. If a top-priority system fault has not been received (438:No), then in operation 442 the state logic may determine whether the stored error trajectory is valid and is not projected to interact with the predicted trajectory of any other object. If the stored error trajectory is invalid and/or is projected to interact with the predicted trajectory of another object (442:No), then in operation 446 the state logic may transition to the high-priority error trajectory state depicted in diagram 400D. If the stored error trajectory is valid and is not projected to interact with the predicted trajectory of another object (442:Yes), then in operation 444 the state logic may determine whether a high-priority vehicle error has been received (e.g., as vehicle status data via vehicle components 222). If a high-priority vehicle error has been received (444:Yes), then in operation 446 the state logic may transition to the high-priority error trajectory state depicted in diagram 400D. If a high-priority vehicle error has not been received (444:No), then in operation 448 the state logic may determine whether an error state release has been requested (e.g., from a vehicle occupant, teleoperator, or automated process) and the release has been allowed. If an error state release has been requested and allowed (448:Yes), then in operation 436 the state logic may transition to the planner trajectory state depicted in diagram 400A. If the error state release has not been requested and/or has not been allowed (448:No), then in operation 450 the state logic may output the stored error trajectory.

Figure 4D:
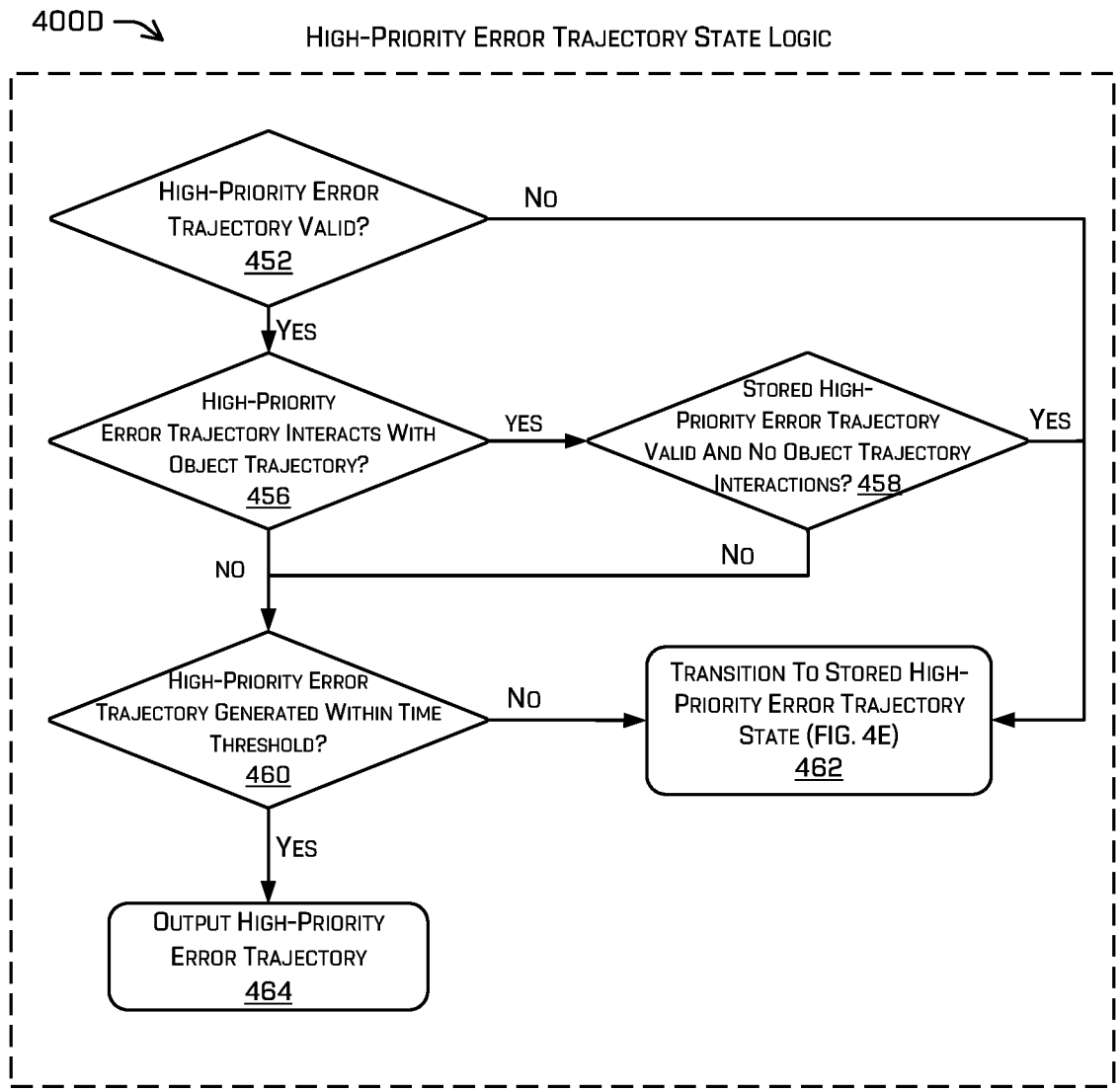

Referring now to FIG. 4D, a high-priority error trajectory state logic diagram 400D is shown that may be included in an example state transition model for determining an output planner trajectory. The state logic diagram 400D may be implemented as a state transition model (or state machine), or a portion thereof in conjunction with the other state logic diagrams shown in FIGS. 4A-4F. In this example, when the state transition model is executed in the high-priority error trajectory state, at operation 452 the state logic may determine whether the high-priority error trajectory is valid. If the high-priority error trajectory is invalid (452:No), then in operation 462 the state logic may transition to the stored high-priority error trajectory state depicted in diagram 400E. If the high-priority error trajectory is valid (452:No), then in operation 456 the state logic may determine whether the high-priority error trajectory is projected to interact with the predicted trajectory of another object. If the high-priority error trajectory is projected to interact with the predicted trajectory of another object (456:Yes), then in operation 458 the state logic may determine whether the stored high-priority error trajectory is valid and is projected to interact with no predicted trajectories of any other objects. If the stored high-priority error trajectory is valid and is projected to interact with no predicted trajectories of any other objects (458:Yes), then in operation 462 the state logic may transition to the stored high-priority error trajectory state depicted in diagram 400E. If the stored high-priority error trajectory is invalid and/or is projected to interact with a predicted trajectory of another object (458:No), then in operation 460 the state logic may determine whether the high-priority error trajectory was generated within a time threshold (e.g., within the current processing cycle for the high-priority error trajectory generator 209). Similarly, if the high-priority error trajectory is not projected to interact with the predicted trajectory of another object (456:No), then then in operation 460 the state logic may determine whether the high-priority error trajectory was generated within a time threshold. In operation 460, if the high-priority error trajectory was not generated within a time threshold (460:No), then in operation 462 the state logic may transition to the stored high-priority error trajectory state depicted in diagram 400E. If the high-priority error trajectory was generated within the time threshold (460:Yes), then in operation 464 the state logic may output the high-priority error trajectory.

Figure 4E:
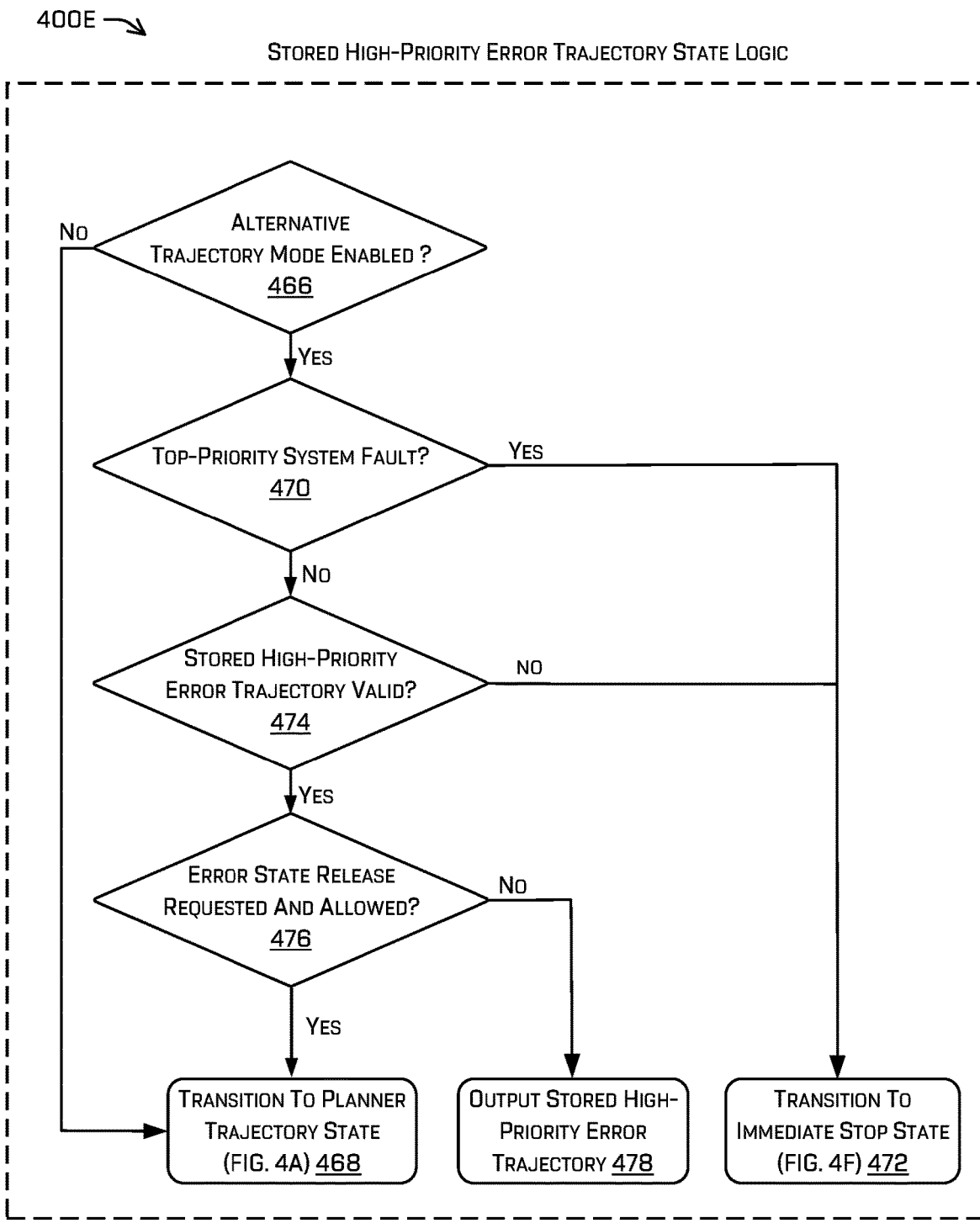

Referring now to FIG. 4E, a stored high-priority error trajectory state logic diagram 400E is shown that may be included in an example state transition model for determining an output planner trajectory. The state logic diagram 400E may be implemented as a state transition model (or state machine), or a portion thereof in conjunction with the other state logic diagrams shown in FIGS. 4A-4F. In this example, when the state transition model is executed in the stored high-priority error trajectory state, at operation 466 the state logic may determine whether the alternative trajectory mode is enabled on the autonomous vehicle. If the alternative trajectory mode is not enabled on the autonomous vehicle (466:No), then in operation 468 the state logic may transition to the planner trajectory state depicted in diagram 400A. If the alternative trajectory mode is enabled on the autonomous vehicle (468:Yes), then in operation 470 the state logic may determine whether a top-priority system fault has been received (e.g., as vehicle status data via vehicle components 222). If a top-priority system fault has been received (470:Yes), then in operation 472 the state logic may transition to the immediate stop state depicted in diagram 400F. If a top-priority system fault has not been received (470:No), then in operation 474 the state logic may determine whether the stored high-priority error trajectory is valid. If the stored high-priority error trajectory is invalid (474:No), then in operation 472 the state logic may transition to the immediate stop state depicted in diagram 400F. If the stored high-priority error trajectory is valid (474:Yes), then in operation 476 the state logic may determine whether an error state release has been requested and the release has been allowed. If an error state release has been requested and allowed (476:Yes), then in operation 468 the state logic may transition to the planner trajectory state depicted in diagram 400A. If the error state release has not been requested and/or has not been allowed (476:No), then in operation 478 the state logic may output the stored high-priority error trajectory.

Figure 4F:
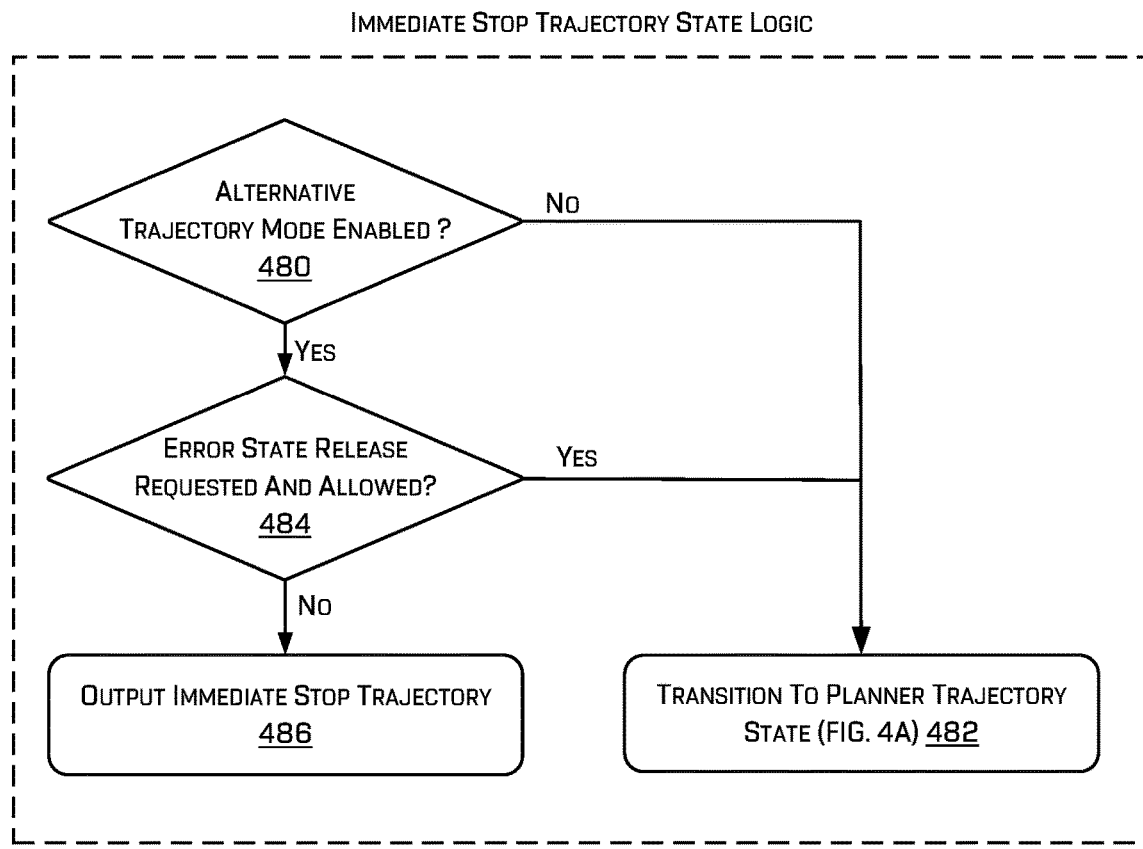

Referring now to FIG. 4F, an immediate stop trajectory state logic diagram 400F is shown that may be included in an example state transition model for determining an output planner trajectory. The state logic diagram 400F may be implemented as a state transition model (or state machine), or a portion thereof in conjunction with the other state logic diagrams shown in FIGS. 4A-4F. In this example, when the state transition model is executed in the immediate stop trajectory state, at operation 480 the state logic may determine whether the alternative trajectory mode is enabled on the autonomous vehicle. If the alternative trajectory mode is not enabled on the autonomous vehicle (480:No), then in operation 482 the state logic may transition to the planner trajectory state depicted in diagram 400A. If the alternative trajectory mode is enabled on the autonomous vehicle (480:Yes), then in operation 484 the state logic may determine whether an error state release has been requested and the release has been allowed. If an error state release has been requested and allowed (484:Yes), then in operation 482 the state logic may transition to the planner trajectory state depicted in diagram 400A. If the error state release has not been requested and/or has not been allowed (484:No), then in operation 486 the state logic may output the immediate stop trajectory.

Figure 5:
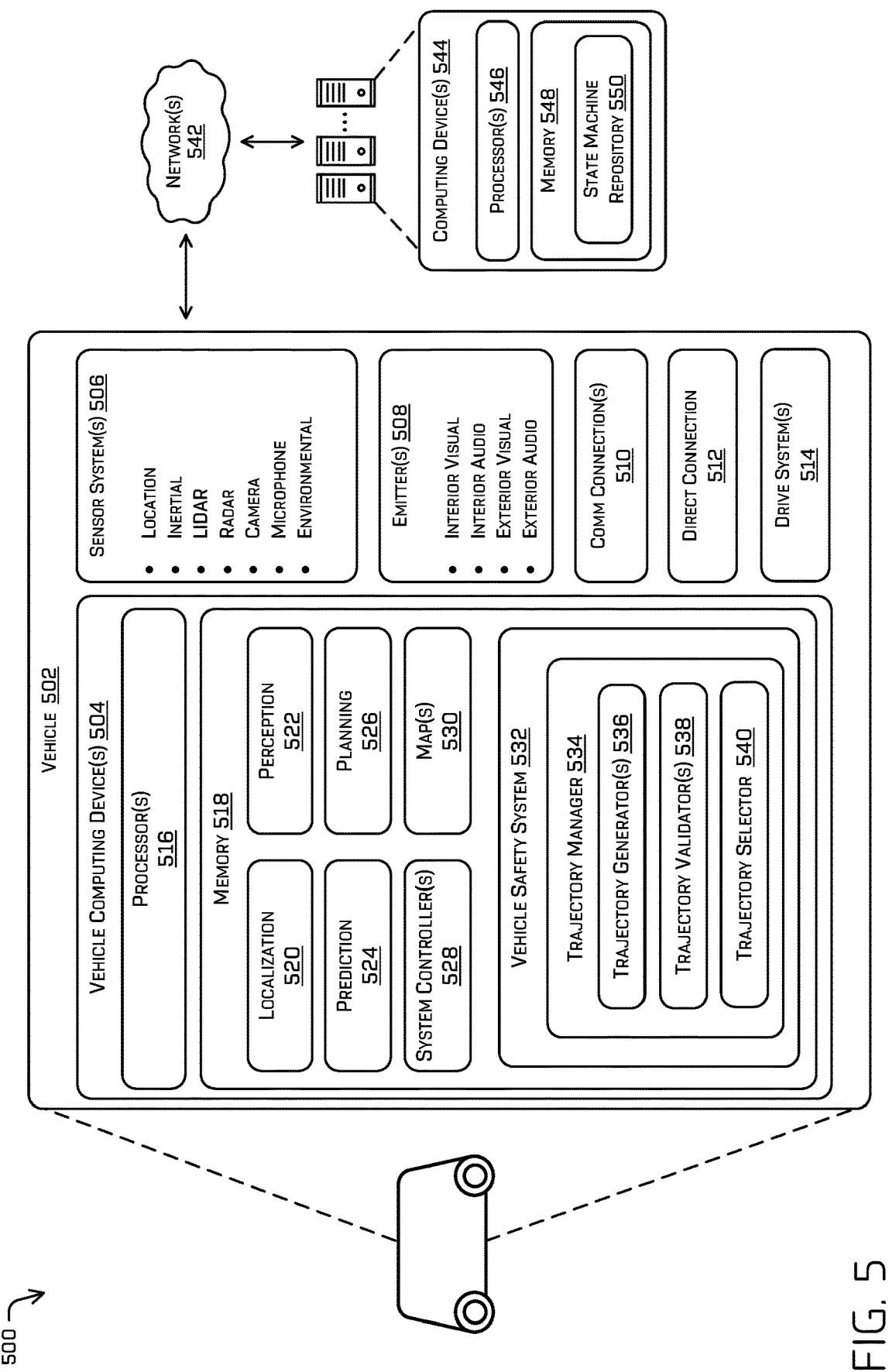
FIG. 5 depicts a block diagram of an example system for implementing various techniques described herein.

FIG. 5 depicts a block diagram of an example system 500 for implementing various techniques described herein. The system 500 can include a vehicle 502, which can correspond to an autonomous or semi-autonomous vehicle configured to perform various techniques described herein for generating and validating vehicle trajectories, and determining a vehicle trajectory based on an output of a state transition model. As shown in this example, vehicle 702 may include components configured to generate multiple possible trajectories, validate the trajectories, receive and analyze status data from vehicle components, and determine (or select) an output trajectory based on the output of a state transition model. The example vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may or may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 may include one or more vehicle computing device(s) 504, one or more sensor systems 506, one or more emitters 508, one or more communication connections 510, at least one direct connection 512, and one or more drive systems 514.

The vehicle computing device(s) 504 can include one or more processors 516 and memory 518 communicatively coupled with the one or more processors 516. In the illustrated example, the vehicle 502 is an autonomous vehicle; however, the vehicle 502 could be any other type of vehicle or robotic platform. In the illustrated example, the memory 518 of the vehicle computing device(s) 504 stores a localization component 520, a perception component 522, a prediction component 524, a planning component 526, one or more system controllers 528, one or more maps 530. Though depicted in FIG. 5 as residing in the memory 518 for illustrative purposes, one or more of the localization component 520, perception component 522, prediction component 524, planning component 526, system controllers 528, and/or maps 530 can additionally, or alternatively, be accessible to the vehicle 702 (e.g., stored on, or otherwise accessible by, memory remote from the vehicle 502).

As shown in this example, the vehicle 502 also may include a vehicle safety system 532. The vehicle safety system 532 may be configured to generate, validate, and select an output trajectory for the vehicle 502 using the various techniques described herein. For instance, the vehicle safety system 532 may include a trajectory manager 534, which may include one or more trajectory generator(s) 536, one or more trajectory validator 538, and/or a trajectory selector 540. The trajectory manager 534, trajectory generator(s) 536, trajectory validator 538, and/or trajectory selector 540 may be similar or identical to the corresponding components described in reference to FIGS. 1-4F and FIG. 6 (e.g., trajectory manager 102, trajectory manager 202, trajectory generator(s) 206, trajectory validator 224, and/or trajectory selector 226). As shown in this example, the vehicle safety system 532 may be implemented separately from the vehicle computing device(s) 504, for example, for improved performance of the vehicle safety system 532 and/or to provide redundancy, error checking, or validation of determinations and commands from the vehicle computing device(s) 504. However, in other examples, the vehicle safety system 532 may be implemented as one or more components within the vehicle computing device(s) 504.

By way of example, the vehicle computing device(s) 504 may be considered to be a primary system, while the vehicle safety system 532 may be considered to be a secondary system. The primary system may generally perform processing to control how the vehicle maneuvers within an environment. The primary system within the vehicle computing device(s) 504 may implement various artificial intelligence (AI) techniques, such as machine learning, to understand an environment around the vehicle 502 and/or instruct the vehicle 502 to move within the environment. The various components of the primary system, such as the localization component 520, perception component 522, prediction component 524, and/or planning component 526 may implement the AI techniques to localize the vehicle, detect objects around the vehicle, segment sensor data, determine classifications of the objects, predict object tracks, generate trajectories for the vehicle 502 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 506.

The vehicle safety system 532 in this example may operate as separate system that receives state data (e.g., perception data) based on the sensor data and AI techniques implemented by the primary system (e.g., vehicle computing device(s) 504), and may perform various techniques described herein for improving vehicle safety and operation, such as collision prediction and avoidance. As described herein, the vehicle safety system 532 may implement techniques for determining predicted trajectories and predicting intersections/collisions based on the predicted trajectories, as well as probabilistic techniques that are based on positioning, velocity, acceleration, etc. of the vehicle and/or objects around the vehicle. In some examples, the vehicle safety system 532 may process data from sensors, such as a subset of sensor data that is processed by the primary system. To illustrate, the primary system may process lidar data, radar data, image data, depth data, etc., while the vehicle safety system 532 may process just lidar data and/or radar data (and/or time of flight data). In other examples, however, the vehicle safety system 532 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

Although depicted in FIG. 5 as residing in the memory 518 for illustrative purposes, it is contemplated that the localization component 520, the perception component 522, the prediction component 524, the planning component 526, the system controllers 528, and/or the maps 530 may additionally, or alternatively, be accessible to the vehicle 502 (e.g., stored on, or otherwise accessible by, memory remote from the vehicle 502, such as, for example, on memory 554 of a remote computing device 544). Similarly, the although the trajectory manager 534, trajectory generator(s) 536, trajectory validator 538, and/or trajectory selector 540 may reside in a separate memory of the vehicle safety system 532, one or more of these components may additionally, or alternatively, be implemented within vehicle computing device(s) 504 or may be accessible to the vehicle 502 (e.g., stored on, or otherwise accessible by, memory remote from the vehicle 502, such as, for example, on memory 548 of a remote computing device 544).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 may provide data to various components of the vehicle 502 to determine an initial position and/or trajectory of the vehicle 502, as discussed herein.

In some instances, and in general, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, stoplight, stop sign, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the prediction component 524 can include functionality to generate predicted information associated with objects in an environment. As an example, the prediction component 524 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 502 traverses an environment. In some examples, the prediction component 524 can generate one or more predicted positions, predicted velocities, predicted trajectories, etc., for such target objects based on attributes of the target object and/or other objects proximate the target object.

In general, the planning component 526 can determine a path for the vehicle 502 to follow to traverse the environment. The planning component 526 can include functionality to determine various routes and trajectories and various levels of detail. For example, the planning component 526 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 526 can generate an instruction for guiding the autonomous vehicle along at least a portion of the route from the first location to the second location. In at least one example, the planning component 526 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In some instances, the planning component 526 can generate one or more trajectories for the vehicle 502 based at least in part on predicted location(s) associated with object(s) in an environment. In some examples, the planning component 526 can use temporal logic, such as linear temporal logic and/or signal temporal logic, to evaluate one or more trajectories of the vehicle 502.

In at least one example, the vehicle computing device(s) 504 can include one or more system controllers 528, which can be configured to control steering, propulsion, braking, safety, emitters, communication, and other systems of the vehicle 502. These system controller(s) 528 can communicate with and/or control corresponding systems of the drive system(s) 514 and/or other components of the vehicle 502. For example, the planning component 526 may generate instructions based at least in part on perception data generated by the perception component 522 and transmit the instructions to the system controller(s) 528, which may control operation of the vehicle 502 based at least in part on the instructions. In some examples, if the planning component 526 receives a notification that a track of an object was "lost" (e.g., an object no longer appears in perception data and isn't occluded by any other objects), the planning component 526 may generate an instruction to bring the vehicle 502 to a safe stop and/or to transmit a request for teleoperator assistance.

The memory 518 can further include one or more maps 530 that can be used by the vehicle 502 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., vectorized information regarding features of an environment, image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 530 can include at least one map (e.g., images and/or a mesh).

In some examples, the vehicle 502 can be controlled based at least in part on the maps 530. That is, the maps 530 can be used in connection with the localization component 520, the perception component 522, the prediction component 524, and/or the planning component 526 to determine a location of the vehicle 502, identify objects in an environment, and/or generate routes and/or trajectories to navigate within an environment. In some examples, the one or more maps 530 can be stored on a remote computing device(s), such as within the memory 548 of the computing device(s) 544, and may be accessible to the vehicle 502 via network(s) 542. In some examples, multiple maps 530 can be retrieved from the memory 548, and stored based on, for example, a characteristic (e.g., type of entity, time of day, day of week, season of the year, etc.). Storing multiple maps 530 can have similar memory requirements, but can increase the speed at which data in a map can be accessed.

As can be understood, the components discussed herein (e.g., the localization component 520, the perception component 522, the prediction component 524, the planning component 526, the system controllers 528, and/or maps 530) are described as divided for illustrative purposes. However, the operations performed by the various components can be combined or performed in any other component. Further, any of the components discussed as being implemented in software can be implemented in hardware, and vice versa. Further, any functionality implemented in the vehicle 502 can be implemented in the computing device(s) 544, or another component (and vice versa).

In at least one example, the sensor system(s) 506 can include time of flight sensors, lidar sensors, radar devices and/or radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 506 can include multiple instances of each of these or other types of sensors. For instance, the time of flight sensors can include individual time of flight sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device(s) 504. Additionally or alternatively, the sensor system(s) 706 can send sensor data, via the one or more networks 542, to the one or more computing device(s) 544 at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 542. For example, the communications connection(s) 510 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. The vehicle 502 can have a single drive system 514, or multiple drive systems 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the localization component 520, the perception component 522, the prediction component 524, the planning component 526, the system controllers 528, and the maps 530, can process sensor data, as described above, and can send their respective outputs, over the one or more network(s) 542, to one or more computing device(s) 544. In at least one example, the respective outputs of the components can be transmitted to the one or more computing device(s) 544 at a particular frequency, after a lapse of a predetermined period of time, in near real-time, etc. Additionally or alternatively, the vehicle 502 can send sensor data to one or more computing device(s) 544 via the network(s) 542, including raw sensor data, processed sensor data and/or representations of sensor data. Such sensor data can be sent as one or more log files to the computing device(s) 544 at a particular frequency, after a lapse of a predetermined period of time, in near real-time, etc.

The computing device(s) 544 can include processor(s) 546 and a memory 548 storing a state machine repository 550. As described above, a state machine repository 550 may store one or more state transition models that can be generated and modified offline, and provided to various vehicles 502 in a fleet. Different state transition models may be provided to different models of vehicles 502, and/or based on the location or operating conditions of the vehicles 502. In various examples, the computing devices 544 may implement one or more machine learning systems or heuristics-based systems to train, test, and optimize different state transition models for different vehicles 502 operating within different environments. Additionally, any of the features or functionalities described in connection with the vehicle safety system 532, trajectory manager 534, trajectory generator(s) 536, trajectory validator 538, and/or trajectory selector 540 also may be performed by computing devices 544.

The processor(s) 516 of the vehicle 502 and the processor(s) 546 of the computing device(s) 544 can be any suitable processor capable of executing instructions to process data and perform operations as described herein. By way of example and not limitation, the processor(s) 516 and 546 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 548 are examples of non-transitory computer-readable media. The memory 518 and 548 can store an operating system and one or more software applications, instructions, programs, and/or data to implement the methods described herein and the functions attributed to the various systems. In various examples, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 544 and/or components of the computing device(s) 544 can be associated with the vehicle 502. That is, the vehicle 502 can perform one or more of the functions associated with the computing device(s) 544, and vice versa.

Figure 6:
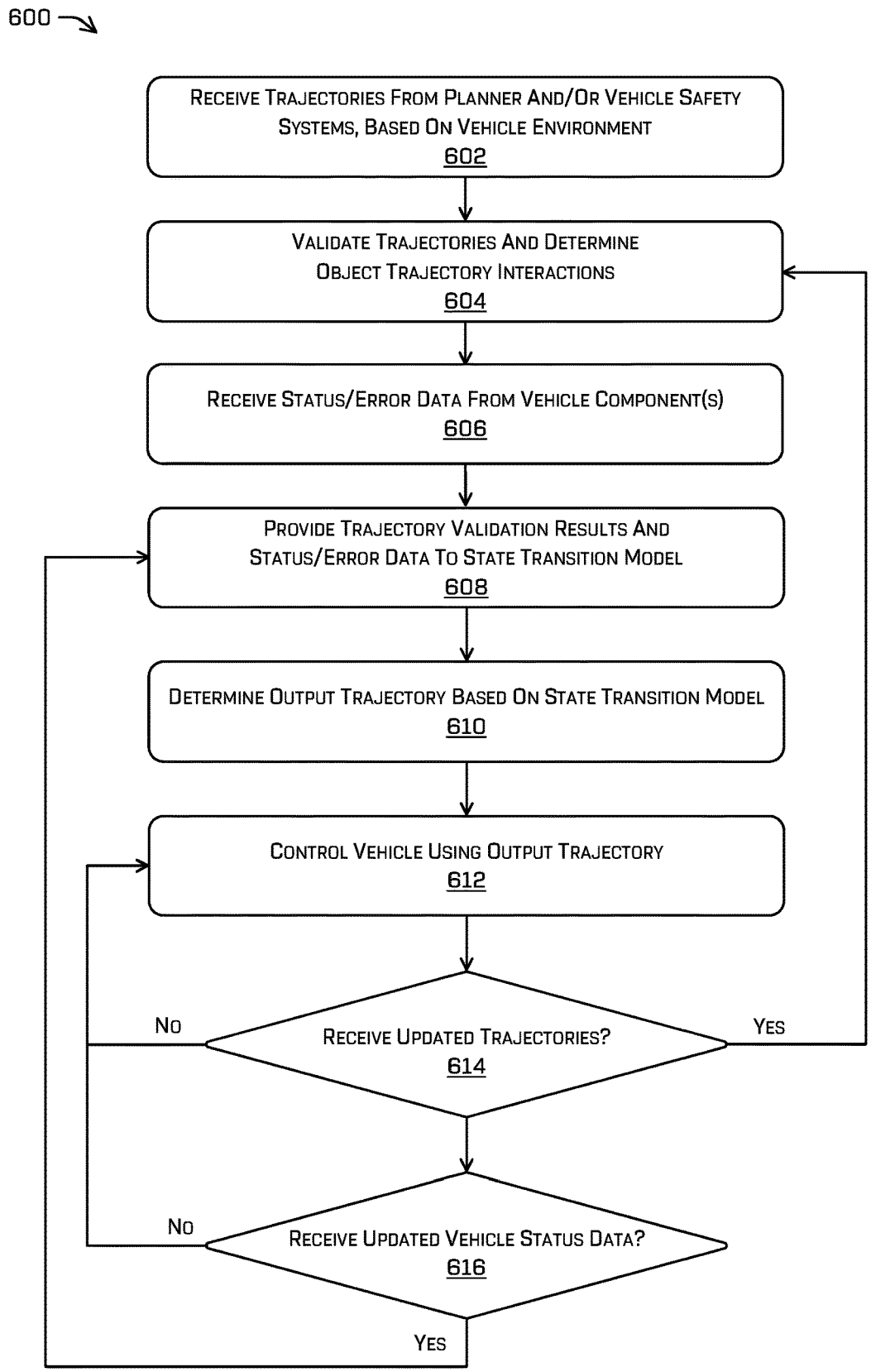
FIG. 6 is a flow diagram illustrating an example process of determining an output trajectory using a state transition model, based on trajectory validation results and vehicle component status data, in accordance with one or more examples of the disclosure.

FIG. 6 is flow diagram depicting an example process 600 for determining an output trajectory using a state transition model, based on trajectory validation results and vehicle component status data. As described below, process 600 may be performed by one or more computer-based components configured to implement various functionalities described herein. For instance, process 600 may be performed by a trajectory manager 202 configured to receive (and/or generate) trajectories from a planning component 204 and one or more trajectory generator(s) 206, and various vehicle status data from one or more vehicle components 222. As described above, a trajectory manager 202 may be integrated into a vehicle safety system of an autonomous vehicle in some examples. However, in other examples, a trajectory manager 202 may be integrated into other systems or components of an autonomous vehicle, and/or types of moving vehicles, mobile devices, image analysis systems, security and surveillance systems, and/or other computer-based systems configured to determine a trajectory based objects detected in an environment.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the trajectory manager 202 may receive one or more candidate trajectories for an autonomous vehicle traversing an environment. As described above, candidate trajectories may include one or more planner trajectories generated by a planning component based on a destination of the autonomous vehicle, and/or one or more alternative candidate trajectories generated by a vehicle safety system or other vehicle components. For instance, trajectory generator 206 may generate various alternative trajectories (e.g., an error trajectory, a high-priority error trajectory, an immediate stop trajectory, etc.) associated with various different vehicle status data and/or errors.

At operation 604, the trajectory manager 202 may validate the candidate trajectories received in operation 602. In some examples a trajectory validator 224 may be configured to evaluate the candidate trajectories received in operation 602. To validate a trajectory, the trajectory validator 224 may execute one or more processes to assess the quality and safety of a candidate trajectory. For instance, the trajectory validator 224 may determine whether a trajectory is valid based on whether or not the vehicle is physically capable of tracking the trajectory. Additionally or alternatively, the trajectory validator 224 may determine that a trajectory is invalid based on a determination that the trajectory intersects, or comes within a threshold distance of intersecting, the predicted trajectory for one or more other objects in the environment.

At operation 606, the trajectory manager 202 may receive vehicle status and/or error data from one or more vehicle components 222. The vehicle status received in operation 606 may include data received from the vehicle sensors, platform, and/or any other vehicle component, and may indicate performance data, errors, component alerts or malfunctions, and/or any other vehicle status data. In some cases, the vehicle status data received in operation 606 may include data identifying particular system faults, errors, alerts, etc., which are associated different types of alternative trajectories (e.g., error trajectories, critical error trajectories, etc.). Certain vehicle status data also may include requests from vehicle components for the autonomous vehicle to follow a particular planner or alternative trajectory (e.g., a planner trajectory, error trajectory, high-priority error trajectory, or immediate stop trajectory).

At operation 608, the trajectory manager 202 may provide the trajectory validation results and the vehicle status and/or error data as input to a state transition model. As described above, a state transition model may be implemented within a trajectory selector 226, using trajectory states and state transition logic to determine an output trajectory. Examples of various state transitions are described above, which may be performed based on any of the trajectory validation results, any of the vehicle status data, and/or any other possible vehicle states. As noted above, state transition models may include state logic associated with the multiple candidate trajectories, allowing the trajectory selector 226 to jointly evaluate the possible trajectories and determine an output trajectory at any point in time, based on the state machine logic.

At operation 610, the trajectory manager 202 may determine an output trajectory based on the state transition model. In some examples, the output from the trajectory selector 226 may include an output state of the state transition model corresponding to one of the candidate trajectories. For instance, the output from the state transition model may correspond to a planner trajectory or to one of multiple alternative trajectories determined by the various vehicle systems (e.g., an error trajectory, and immediate stop trajectory, etc.). Additionally, the output from the state transition model may correspond to a previously generated and stored trajectory associated with a previous computing cycle of the autonomous vehicle.

At operation 612, the trajectory manager 202 may control the autonomous based at least in part on the output trajectory determined using the state transition model. For example, the trajectory manager 202 may provide the output trajectory to a planning component and/or system controllers of the autonomous vehicle, with instructions for the vehicle to follow the output trajectory. In other examples, controlling the autonomous vehicle in operation 612 may include engaging or disengaging a vehicle safety system based on the output trajectory, changing between two different planner trajectories, between two different alternative trajectories, or between a planner and an alternative trajectory (or vice versa). Additional vehicle control functionality in operation 612 may include activating interior or exterior emitters (e.g., warning lights, horn or audio alerts, etc.), engaging or disengaging an autonomous driving mode, initiating a request for teleoperator assistance, and the like.

At operation 614, the trajectory manager 202 may determine whether one or more additional trajectories has been received. As noted above, the planning component 204, the trajectory generator 206, and/or other sources of candidate trajectories may periodically re-generate and/or update each trajectory multiple times as the vehicle traverses the environment. These updates may be based on the processing and/or output cycle of the respective components, and thus updates to the candidate trajectories may be received by the trajectory manager 202 from different components at different unsynchronized times. In this example, if an additional trajectory (e.g., updated planner or error trajectory) has not been received (614:No), then the trajectory manager 202 may continue to publish the same trajectory being used to control the autonomous vehicle in operation 612. However, when an additional trajectory (e.g., updated planner or error trajectory) is received (614:Yes), the trajectory manager 202 may return to operation 604 to validate the updated trajectories and re-execute the state transition model based on the updated trajectory validations.

Similarly, at operation 616 the trajectory manager 202 may determine whether additional vehicle status data has been received from any of the vehicle components 222. Although operation 616 is shown separately from and after operation 614 for clarity, it can be understood from the context of this disclosure that operation 616 also can be performed before or contemporaneous with operation 614, or can be integrated into operation 614. As with updated trajectories, updated vehicle status data may be received from any number of independent vehicle components 222, at different and/or unsynchronized times. In this example, if additional vehicle status data (e.g., an component error, collision alert, request for an alternative trajectory, or request to return from an alternative trajectory) has not been received (616:No), then the trajectory manager 202 may continue to publish the same trajectory being used to control the autonomous vehicle in operation 612. However, when an additional trajectory (e.g., updated planner or error trajectory) is received (616:Yes), the trajectory manager 202 may return to operation 608 to re-execute the state transition model based on the updated vehicle status data.

Example Clauses

A. A system comprising: one or more processors; and one or more computer-readable media storing computer-executable instructions that, when executed, cause the one or more processors to perform operations comprising: receiving sensor data from a sensor associated with an autonomous vehicle traversing an environment; determining, based at least in part on the sensor data, a first trajectory, using a planning component of the autonomous vehicle; determining, based at in part on the sensor data and a vehicle safety system of the autonomous vehicle, a second trajectory; validating the first trajectory to determine a first validation result; validating the second trajectory to determine a second validation result; receiving an error output by a component of the autonomous vehicle; providing, to a state transition model, the first validation result, the second validation result, and the error output; determining, as an output trajectory and based at least in part on an output of the state transition model, the first trajectory or the second trajectory; and controlling the autonomous vehicle within the environment based at least in part on the output trajectory.

B. The system of paragraph A, the operations further comprising: determining a third trajectory, using the vehicle safety system of the autonomous vehicle, wherein the second trajectory is associated with a first deceleration, and the third trajectory is associated with a second deceleration having a magnitude greater than the first deceleration; and determining that the error output is associated with the second trajectory or the third trajectory.

C. The system of paragraph A, wherein determining the output trajectory comprises: determining that the first trajectory is invalid; transitioning from a first state of the state transition model to a second state of the state transition model, based at least in part on determining that the first trajectory is invalid; and determining the second trajectory as the output trajectory.

D. The system of paragraph A, wherein validating the first trajectory comprises one or more of: determining whether the autonomous vehicle is capable of executing the first trajectory; or determining whether the first trajectory intersects with an object trajectory associated with an object in the environment.

E. The system of paragraph A, wherein the operations further comprise: receiving an indication to enable an alternative trajectory mode, and wherein determining the output trajectory comprises: transitioning from a first state of the state transition model associated with the first trajectory to a second state of the state transition model associated with the second trajectory; and transitioning from the second state back to the first state, based at least in part on the first validation result and the second validation result.

F. A method comprising: receiving sensor data from a sensor associated with a vehicle; determining, based at least in part on the sensor data, a first trajectory and a second trajectory; validating the first trajectory to determine a first validation result; validating the second trajectory to determine a second validation result; receiving additional data associated with a component of the vehicle; providing, to a state transition model, the first validation result, the second validation result, and the additional data; determining, as an output trajectory and based at least in part on an output of the state transition model, the first trajectory or the second trajectory; and controlling the vehicle within a driving environment based at least in part on the output trajectory.

G. The method of paragraph F, wherein: the first trajectory is a first stopping trajectory associated with a first deceleration; the second trajectory is a second stopping trajectory associated with a second deceleration, wherein the first deceleration is different from the second deceleration; and the additional data includes a request to transition the vehicle to an alternative trajectory.

H. The method of paragraph F, wherein the first trajectory is based at least in part on a first output of a trajectory generator at a first time, and the second trajectory is based at least in part on a second output of the trajectory generator at a second time before the first time, and wherein determining the output trajectory comprises: determining that the first trajectory is invalid; transitioning from a first state of the state transition model to a second state of the state transition model, based at least in part on determining that the first trajectory is invalid, wherein the second trajectory is associated with the second state; and determining the second trajectory as the output trajectory.

I. The method of paragraph F, wherein validating the first trajectory comprises one or more of: determining whether the vehicle is capable of executing the first trajectory; or determining whether the first trajectory intersects with an object trajectory associated with an object in the driving environment.

J. The method of paragraph F, wherein: determining the first trajectory comprises receiving the first trajectory from a first system associated with the vehicle; and determining the second trajectory comprises receiving the second trajectory from a second system associated with the vehicle configured to output a stopping trajectory based at least in part on the sensor data.

K. The method of paragraph J, wherein the method further comprises: receiving an indication to enable an alternative trajectory mode, and wherein determining the output trajectory comprises: transitioning from a first state of the state transition model associated with the first trajectory to a second state of the state transition model associated with the second trajectory; and transitioning from the second state back to the first state, based at least in part on the first validation result and the second validation result.

L. The method of paragraph F, wherein: validating the first trajectory comprises determining a distance between the first trajectory at a first time and an object trajectory; and determining the output trajectory comprises transitioning from a first state of the state transition model to a second state of the state transition model, based at least in part on comparing the distance to a distance threshold.

M. The method of paragraph F, wherein receiving the additional data comprises: receiving error data associated with the component of the vehicle; providing a user interface including an error output based at least in part on the error data; and receiving, as the additional data and via the user interface, a user response associated with the error output.

N. One or more non transitory computer readable media storing instructions executable by a processor, wherein the instructions, when executed, cause the processor to perform operations comprising: receiving sensor data from a sensor associated with a vehicle; determining, based at least in part on the sensor data, a first trajectory and a second trajectory; validating the first trajectory to determine a first validation result; validating the second trajectory to determine a second validation result; receiving additional data associated with a component of the vehicle; providing, to a state transition model, the first validation result, the second validation result, and the additional data; determining, as an output trajectory and based at least in part on an output of the state transition model, the first trajectory or the second trajectory; and controlling the vehicle within a driving environment based at least in part on the output trajectory.

O. The one or more non transitory computer readable media of paragraph N, wherein: the first trajectory is a first stopping trajectory associated with a first deceleration; the second trajectory is a second stopping trajectory associated with a second deceleration, wherein the first deceleration is different from the second deceleration; and the additional data includes a request to transition the vehicle to an alternative trajectory.

P. The one or more non transitory computer readable media of paragraph N, wherein the first trajectory is based at least in part on a first output of a trajectory generator at a first time, and the second trajectory is based at least in part on a second output of the trajectory generator at a second time before the first time, and wherein determining the output trajectory comprises: determining that the first trajectory is invalid; transitioning from a first state of the state transition model to a second state of the state transition model, based at least in part on determining that the first trajectory is invalid, wherein the second trajectory is associated with the second state; and determining the second trajectory as the output trajectory.

Q. The one or more non transitory computer readable media of paragraph N, wherein validating the first trajectory comprises one or more of: determining whether the vehicle is capable of executing the first trajectory; or determining whether the first trajectory intersects with an object trajectory associated with an object in the driving environment.

R. The one or more non transitory computer readable media of paragraph N, wherein: determining the first trajectory comprises receiving the first trajectory from first system associated with the vehicle; and determining the second trajectory comprises receiving the second trajectory from a second system associated with the vehicle configured to output a stopping trajectory based at least in part on the sensor data.

S. The one or more non transitory computer readable media of paragraph R, the operations further comprising: receiving an indication to enable an alternative trajectory mode, and wherein determining the output trajectory comprises: transitioning from a first state of the state transition model associated with the first trajectory to a second state of the state transition model associated with the second trajectory; and transitioning from the second state back to the first state, based at least in part on the first validation result and the second validation result.

T. The one or more non transitory computer readable media of paragraph N, wherein: validating the first trajectory comprises determining a distance between the first trajectory at a first time and an object trajectory; and determining the output trajectory comprises transitioning from a first state of the state transition model to a second state of the state transition model, based at least in part on comparing the distance to a distance threshold.

While the example clauses described above are described with respect to particular examples, it should be understood that, in the context of this document, the content of the example clauses can be implemented via a method, device, system, a computer-readable medium, and/or another example. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate examples are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing computer-executable instructions that, when executed, cause the one or more processors to perform operations comprising:
receiving sensor data from a sensor associated with an autonomous vehicle traversing an environment;
determining, based at least in part on the sensor data, a first trajectory, using a planning component of the autonomous vehicle;
determining, based at in part on the sensor data and a vehicle safety system of the autonomous vehicle, a second trajectory;
validating the first trajectory to determine a first validation result;

validating the second trajectory to determine a second validation result;

receiving an error output by a component of the autonomous vehicle;

providing, to a first state machine associated with the first trajectory, the first validation result and the error output, the first state machine comprising first state logic for alternatively determining the first trajectory or transitioning to a different state machine associated with a different trajectory;

based at least in part on the first state logic of the first state machine, transitioning to a second state machine associated with the second trajectory;

providing, to the second state machine, the second validation result and the error output;

determining an output trajectory based at least in part on the second state machine; and controlling the autonomous vehicle within the environment based at least in part on the output trajectory.

2. The system of claim 1, the operations further comprising:

determining a third trajectory, using the vehicle safety system of the autonomous vehicle, wherein the second trajectory is associated with a first deceleration, and the third trajectory is associated with a second deceleration having a magnitude greater than the first deceleration; and determining that the error output is associated with the second trajectory or the third trajectory.

3. The system of claim 1, wherein determining the output trajectory comprises:

determining that the first trajectory is invalid;

transitioning from the first state machine to the second state machine, based at least in part on determining that the first trajectory is invalid; and determining the second trajectory as the output trajectory.

4. The system of claim 1, wherein validating the first trajectory comprises one or more of:

determining whether the autonomous vehicle is capable of executing the first trajectory; or determining whether the first trajectory intersects with an object trajectory associated with an object in the environment.

5. The system of claim 1, wherein the operations further comprise:

receiving an indication to enable an alternative trajectory mode, and wherein determining the output trajectory comprises:
transitioning from the second state machine back to the first state machine, based at least in part on the first validation result and the second validation result.

6. A method comprising:

receiving sensor data from a sensor associated with a vehicle;

determining, based at least in part on the sensor data, a first trajectory and a second trajectory;

validating the first trajectory to determine a first validation result;

validating the second trajectory to determine a second validation result;

receiving additional data associated with a component of the vehicle;

providing, to a first state machine associated with the first trajectory, the first validation result and the additional data, the first state machine comprising first state logic for alternatively determining the first trajectory or transitioning to a different state machine associated with a different trajectory;

based at least in part on the first state logic of the first state machine, transitioning to a second state machine associated with the second trajectory;

providing, to the second state machine the second validation result and the additional data;

determining an output trajectory based at least in part on the second state machine; and controlling the vehicle within a driving environment based at least in part on the output trajectory.

7. The method of claim 6, wherein:

the first trajectory is a first stopping trajectory associated with a first deceleration;

the second trajectory is a second stopping trajectory associated with a second deceleration, wherein the first deceleration is different from the second deceleration; and the additional data includes a request to transition the vehicle to an alternative trajectory.

8. The method of claim 6, wherein:

determining the first trajectory comprises receiving the first trajectory from first system associated with the vehicle; and determining the second trajectory comprises receiving the second trajectory from a second system associated with the vehicle configured to output a stopping trajectory based at least in part on the sensor data.

9. The method of claim 8, wherein the method further comprises:

receiving an indication to enable an alternative trajectory mode, and wherein determining the output trajectory comprises:
transitioning from the second state machine back to the first state machine, based at least in part on the first validation result and the second validation result.

10. The method of claim 6, wherein:

validating the first trajectory comprises determining a distance between the first trajectory at a first time and an object trajectory; and transitioning from the first state machine to the second state machine is based at least in part on comparing the distance to a distance threshold.

11. The method of claim 6, wherein receiving the additional data comprises:

receiving error data associated with the component of the vehicle;

providing a user interface including an error output based at least in part on the error data; and receiving, as the additional data and via the user interface, a user response associated with the error output.

12. The method of claim 6, wherein:

the first trajectory comprises a current first trajectory of a first trajectory type;

the second trajectory comprises a current second trajectory of a second trajectory type; and the vehicle is configured to periodically generate updated trajectories of the first trajectory type, and to independently periodically generate updated trajectories of the second trajectory type.

13. The method of claim 6, wherein:

the first state machine includes a first set of finite states and first transition criteria between the first set of finite states; and the second state machine includes a second set of finite states and second transition criteria between the second set of finite states.

14. One or more non-transitory computer-readable media storing instructions executable by a processor, wherein the instructions, when executed, cause the processor to perform operations comprising:
 receiving sensor data from a sensor associated with a vehicle;
 determining, based at least in part on the sensor data, a first trajectory and a second trajectory;
 validating the first trajectory to determine a first validation result;
 validating the second trajectory to determine a second validation result;
 receiving additional data associated with a component of the vehicle;
 providing, to a first state machine associated with the first trajectory, the first validation result and the additional data, the first state machine comprising first state logic for alternatively determining the first trajectory or transitioning to a different state machine associated with a different trajectory;
 based at least in part on the first state logic of the first state machine, transitioning to a second state machine associated with the second trajectory;
 providing, to the second state machine, the second validation result and the additional data;
 determining an output trajectory based at least in part on the second state machine; and
 controlling the vehicle within a driving environment based at least in part on the output trajectory.

15. The one or more non-transitory computer-readable media of claim 14, wherein:
 the first trajectory is a first stopping trajectory associated with a first deceleration;
 the second trajectory is a second stopping trajectory associated with a second deceleration, wherein the first deceleration is different from the second deceleration; and
 the additional data includes a request to transition the vehicle to an alternative trajectory.

16. The one or more non-transitory computer-readable media of claim 14, wherein the first trajectory is based at least in part on a first output of a trajectory generator at a first time, and the second trajectory is based at least in part on a second output of the trajectory generator at a second time before the first time.

17. The one or more non-transitory computer-readable media of claim 14, wherein validating the first trajectory comprises one or more of:
 determining whether the vehicle is capable of executing the first trajectory; or
 determining whether the first trajectory intersects with an object trajectory associated with an object in the driving environment.

18. The one or more non-transitory computer-readable media of claim 14, wherein:
 determining the first trajectory comprises receiving the first trajectory from first system associated with the vehicle; and
 determining the second trajectory comprises receiving the second trajectory from a second system associated with the vehicle configured to output a stopping trajectory based at least in part on the sensor data.

19. The one or more non-transitory computer-readable media of claim 18, the operations further comprising:
 receiving an indication to enable an alternative trajectory mode, and wherein determining the output trajectory comprises:
  transitioning from the second state machine back to the first state machine based at least in part on the first validation result and the second validation result.

20. The one or more non-transitory computer-readable media of claim 14, wherein:
 validating the first trajectory comprises determining a distance between the first trajectory at a first time and an object trajectory; and
 transitioning from the first state machine to the second state machine is based at least in part on comparing the distance to a distance threshold.

* * * * *